United States Patent
Lee et al.

(10) Patent No.: US 9,856,341 B2
(45) Date of Patent: Jan. 2, 2018

(54) POLYMER, AND ELECTROLYTE AND LITHIUM SECONDARY BATTERY INCLUDING THE SAME

(71) Applicant: Samsung Electronics Co., Ltd., Suwon-si, Gyeonggi-do (KR)

(72) Inventors: Myungjin Lee, Seoul (KR); Kihyun Kim, Seoul (KR); Hyorang Kang, Anyang-si (KR); Jirae Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 292 days.

(21) Appl. No.: 14/732,941

(22) Filed: Jun. 8, 2015

(65) Prior Publication Data

US 2016/0190641 A1 Jun. 30, 2016

(30) Foreign Application Priority Data

Dec. 26, 2014 (KR) .................... 10-2014-0191131

(51) Int. Cl.
| | |
|---|---|
| C08F 220/28 | (2006.01) |
| H01M 10/0525 | (2010.01) |
| H01M 10/0565 | (2010.01) |
| H01M 10/0567 | (2010.01) |
| H01M 10/0568 | (2010.01) |

(52) U.S. Cl.
CPC ....... *C08F 220/28* (2013.01); *H01M 10/0565* (2013.01); *H01M 10/0525* (2013.01); *H01M 10/0567* (2013.01); *H01M 10/0568* (2013.01); *H01M 2220/20* (2013.01); *H01M 2220/30* (2013.01); *H01M 2300/0082* (2013.01); *Y02E 60/122* (2013.01)

(58) Field of Classification Search
CPC ............. H01M 4/382; H01M 10/0564; H01M 10/0565; H01M 10/0566; H01M 10/0525; H01M 2300/0025; H01M 2300/0082; H01M 2300/0085; C08F 220/28
See application file for complete search history.

(56) References Cited

U.S. PATENT DOCUMENTS

| | | | |
|---|---|---|---|
| 6,063,522 A | 5/2000 | Hamrock et al. | |
| 6,361,901 B1 * | 3/2002 | Mayes ................... | H01M 4/13 429/188 |
| 6,413,676 B1 * | 7/2002 | Munshi .................. | H01M 4/131 429/303 |
| 2004/0202938 A1* | 10/2004 | Noguchi ............ | C01G 45/1242 429/231.95 |
| 2009/0075176 A1* | 3/2009 | Singh ..................... | H01B 1/122 429/309 |
| 2011/0129760 A1* | 6/2011 | Takeshita ............ | H01M 8/1048 429/492 |

FOREIGN PATENT DOCUMENTS

| | | |
|---|---|---|
| CN | 103509153 A | 1/2014 |
| WO | 2013034848 A1 | 3/2013 |

OTHER PUBLICATIONS

Jangu, C., Savage, A.M., Zhang, Z., Schultz, A.R., Madsen, L.A., Beyer, F.L., Long, T.E.—Sulfonimide-Containing Triblock Copolymers for Improved Conductivity and Mechanical Performance, Macromolecules, 2015, 48, 4520-4528 (published on Jul. 2, 2015).*
Rachid Meziane, et al., "Single-ion polymer electrolytes based on a delocalized polyanion for lithium batteries", Electrochimica Acta 57 (2011) 14-19.
Shaowei Feng, et al., "Single lithium-ion conducting polymer electrolytes based on poly[(4-styrenesulfonyl)(trifluoromethanesulfonyl)imide] anions", Electrochimica Acta 93 (2013) 254-263.

* cited by examiner

*Primary Examiner* — Anca Eoff
(74) *Attorney, Agent, or Firm* — Cantor Colburn LLP

(57) ABSTRACT

A polymer including a first repeating unit represented by Formula 1, a second repeating unit represented by Formula 2, and a third repeating unit:

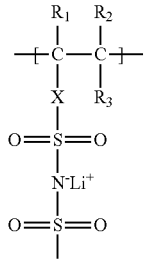

Formula 1

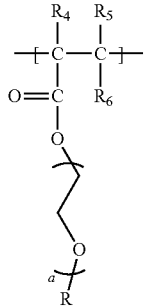

Formula 2 wherein $R_1$ to $R_3$, X, and Rf in Formula 1 and $R_4$ to $R_6$, R, and a in Formula 2 are the same as those defined in the detailed description, and wherein the polymer has a glass transition temperature of about 25° C. or less or a Young's modulus of about 10 megaPascals or greater.

19 Claims, 11 Drawing Sheets

POLYMER, AND ELECTROLYTE AND LITHIUM SECONDARY BATTERY INCLUDING THE SAME

CROSS-REFERENCE TO RELATED APPLICATION

This application claims priority to and the benefit of Korean Patent Application No. 10-2014-0191131, filed on Dec. 26, 2014, in the Korean Intellectual Property Office, the disclosure of which is incorporated herein in its entirety by reference.

BACKGROUND

1. Field

The present disclosure relates to polymers, and electrolytes and lithium secondary batteries including the polymers.

2. Description of the Related Art

Lithium secondary batteries, as high performance secondary batteries having the highest energy density among currently commercialized secondary batteries, may, for example, be used in various products such as electric vehicles.

A lithium metal thin film may be used as an anode of a lithium secondary battery. When the lithium metal thin film is used as the anode, the reactivity with a liquid electrolyte during charging and/or discharging may be high due to the high reactivity of lithium. Also, since dendrites may be formed on the lithium anode thin film, the lifetime and stability of the lithium secondary battery including the lithium metal thin film may be reduced. Therefore, improvement of the lifetime and stability of the lithium secondary battery is desired.

SUMMARY

Provided are novel polymers, electrolytes including the same, and preparation methods thereof.

Provided are lithium secondary batteries having improved cell performance by including the above-described electrolyte.

Additional aspects will be set forth in part in the description which follows and, in part, will be apparent from the description, or may be learned by practice of the presented exemplary embodiments.

According to an aspect of an exemplary embodiment, a polymer includes:

a first repeating unit represented by Formula 1; a second repeating unit represented by Formula 2; and a third repeating unit:

Formula 1

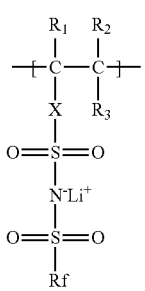

wherein in Formula 1, $R_1$ to $R_3$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group, X represents a substituted or unsubstituted $C_1$-$C_{20}$ alkylene group, a substituted or unsubstituted $C_1$-$C_{20}$ heteroalkylene group, a substituted or unsubstituted $C_6$-$C_{20}$ arylene group, a substituted or unsubstituted $C_2$-$C_{20}$ heteroarylene group, a substituted or unsubstituted $C_2$-$C_{20}$ heterocyclic group, a substituted or unsubstituted $C_4$-$C_{20}$ carbocyclic group, or —C(=O)O(CH$_2$)$_n$— (where n is an integer between 1 and 10), and Rf represents fluorine, a $C_1$-$C_{20}$ perfluorinated alkyl group, a $C_3$-$C_{20}$ perfluorinated carbocyclic group, a $C_6$-$C_{20}$ perfluorinated aryl group, or a $C_2$-$C_{20}$ perfluorinated heteroaryl group, and Formula 2

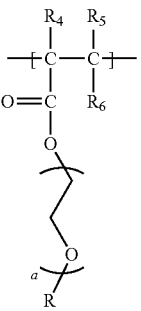

wherein in Formula 2, $R_4$ to $R_6$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group, R represents hydrogen, a $C_1$-$C_{20}$ alkyl group, a $C_1$-$C_{20}$ heteroalkyl group, a $C_6$-$C_{20}$ aryl group, a $C_2$-$C_{20}$ heteroaryl group, a $C_2$-$C_{20}$ heterocyclic group, a $C_4$-$C_{20}$ carbocyclic group, —PO$_3$Li, or —SO$_2$Li, and a is an integer between 1 and 20, wherein the polymer has a glass transition temperature of about 25° C. or less or a Young's modulus of about 10 megaPascals or greater.

According to an aspect of another exemplary embodiment, an electrolyte includes the above-described polymer.

The electrolyte may further include at least one inorganic particle selected from SiO$_2$, TiO$_2$, ZrO$_2$, HfO$_2$, ZnO, Al$_2$O$_3$, BaTiO$_3$, and a metal-organic framework.

The electrolyte may further include at least one ionic liquid which is selected from compounds including:

(i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof; and (ii) at least one anion selected from BE$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, SO$_4^-$, PF$_6^-$, (C$_2$F$_5$SO$_2$)$_2$N$^-$, (C$_2$F$_6$SO$_2$)(CF$_3$SO$_2$)N$^-$, (CF$_3$SO$_2$)$_2$N$^-$, NO$_3^-$, Al$_2$Cl$_7^-$, CH$_3$COO$^-$, (CF$_3$SO$_2$)$_3$C$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, and (O(CF$_3$)$_2$C$_2$(CF$_3$)$_2$O)$_2$PO$^-$.

According to an aspect of another exemplary embodiment, a lithium secondary battery includes:
a cathode,
an anode, and
the above-described electrolyte disposed between the cathode and the anode.

The anode may be a lithium metal or lithium metal alloy electrode.

BRIEF DESCRIPTION OF THE DRAWINGS

These and/or other aspects will become apparent and more readily appreciated from the following description of the exemplary embodiments, taken in conjunction with the accompanying drawings in which:

FIG. 4B 4A is a graph of intensity (arbitrary units, a. u.) versus chemical shift (parts per million, ppm), which illustrates results of $^7$Li-NMR spectrum analysis of the polymer obtained according to Example 1;

DETAILED DESCRIPTION

Figure 1A:
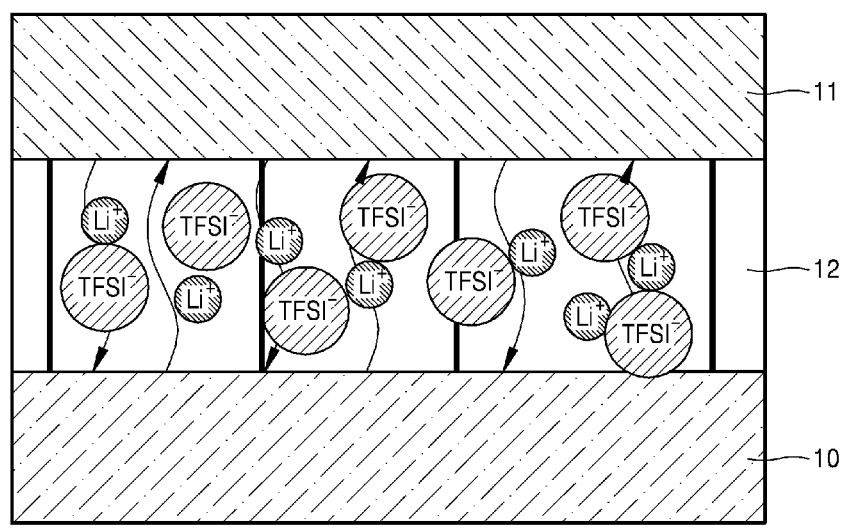
FIGS. 1A to 1C are schematic views illustrating an operational effect of a lithium battery which includes an electrolyte according to an exemplary embodiment of the present disclosure.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary polymer, an electrolyte including the same, a preparation method thereof, and a lithium secondary battery including the electrolyte will be described in more detail with reference to the accompanying drawings.

Provided is a polymer including:
a first repeating unit represented by Formula 1,
a second repeating unit represented by Formula 2, and
a third repeating unit,
wherein the polymer has a glass transition temperature of room temperature (25° C.) or less or a Young's modulus of about 10 megaPascals (MPa) or greater.

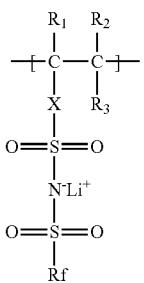

Formula 1

In Formula 1, $R_1$ to $R_3$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group, X represents a substituted or unsubstituted $C_1$-$C_{20}$ alkylene group, a substituted or unsubstituted $C_1$-$C_{20}$ heteroalkylene group, a substituted or unsubstituted $C_6$-$C_{20}$ arylene group, a substituted or unsubstituted $C_2$-$C_{20}$ heteroarylene group, a substituted or unsubstituted $C_2$-$C_{20}$ heterocyclic group, a substituted or unsubstituted $C_4$-$C_{20}$ carbocyclic group, or —C(=O)O(CH$_2$)$_n$— (where n is an integer between 1 and 10), and Rf represents fluorine, a $C_1$-$C_{20}$ perfluorinated alkyl group, a $C_3$-$C_{20}$ perfluorinated carbocyclic group, a $C_6$-$C_{20}$ perfluorinated aryl group, or a $C_2$-$C_{20}$ perfluorinated heteroaryl group, and

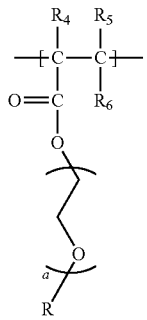

Formula 2

In Formula 2, $R_4$ to $R_6$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group, R represents hydrogen, a $C_1$-$C_{20}$ alkyl group, a $C_6$-$C_{20}$ aryl group, a $C_2$-$C_{20}$ heteroaryl group, a $C_2$-$C_{20}$ heterocyclic group, a $C_4$-$C_{20}$ carbocyclic group, —PO$_3$Li, or —SO$_2$Li, and a is an integer between 1 and 20.

The first repeating unit represented by Formula 1 denotes a lithium single-ion conducting monomer and the second repeating unit represented by Formula 2 is a (meth)acryl monomer having a lithium ion conductive group. The above monomer includes an alkylene oxide which may provide a lithium-ion conducting path.

The lithium ion conductive group denotes an ethylene oxide unit. Since oxygen in the ethylene oxide unit forms coordination bonds with lithium, the diffusion of lithium may be facilitated to improve lithium ion conductivity.

The third repeating unit represented by Formula 3, as a monomer capable of improving physical properties and mechanical strength of the polymer, may be a monomer for forming a rubber polymer having a glass transition temperature of room temperature or less, for example, about −5° C. to about 25° C., or may have a functional group having an ion conductive group having a Young's modulus of about 10 MPa or greater.

X in Formula 1 is phenylene or —C(=O)O(CH$_2$)$_n$— (where n is an integer between 1 and 5). When X is —C(=O)O(CH$_2$)$_n$—, the carbonyl may be linked to a carbon atom of the polymer backbone.

An amount of the first repeating unit represented by Formula 1 in the polymer is in a range of about 0.2 moles (mol) to about 0.9 mol, for example, about 0.4 mol to about 0.8 mol, based on 1 mol of the second repeating unit represented by Formula 2. While not wishing to be bound by a theory, it is believed that when the amount of the first repeating unit represented by Formula 1 is within the above range, an electrolyte having excellent conductivity and lithium ion mobility may be obtained.

An amount of the third repeating unit represented by Formula 3 is in a range of about 0.1 mol to about 0.8 mol, for example, about 0.2 mol to about 0.75 mol, based on 1 mol of the second repeating unit. While not wishing to be bound by a theory, it is believed that when the amount of the third repeating unit is within the above range, mechanical properties and durability of the polymer are excellent.

According to an embodiment of the present disclosure, a mixing molar ratio of the first repeating unit represented by Formula 1 to the second repeating unit represented by Formula 2 and the third repeating unit represented by Formula 3 in the polymer is about 0.2:0.5:0.3 (i.e., 0.4:1:0.6), about 0.3:0.4:0.3 (i.e., 0.8:1:0.8), about 0.4:0.4:0.2 (i.e., 1:1:0.5), about 0.2:0.6:0.2 (i.e., 0.33:1:0.33), or about 0.3:0.6:0.1 (i.e., 0.5:1:0.2).

When the third repeating unit is used, a polymer having excellent mechanical properties may be formed in which a Young's modulus, as an elastic modulus, is about 10 MPa or more, for example, about 10 MPa to about 50 MPa, at 25° C. When the polymer satisfying the above Young's modulus is used, an electrolyte capable of securing both ionic conductivity and mechanical properties, which are necessary for battery performance, at room temperature may be prepared.

The third repeating unit, for example, may be a repeating unit represented by Formula 3 below.

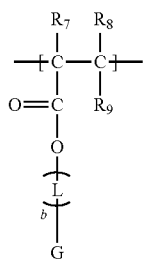

Formula 3

In Formula 3, $R_7$ to $R_9$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group, L represents a substituted or unsubstituted $C_1$-$C_{20}$ alkylene group, a substituted or unsubstituted $C_1$-$C_{20}$ heteroalkylene group, a substituted or unsubstituted $C_6$-$C_{20}$ arylene group, a substituted or unsubstituted $C_2$-$C_{20}$ heteroarylene group, a substituted or unsubstituted $C_2$-$C_{20}$ heterocyclic group, or a substituted or unsubstituted $C_4$-$C_{20}$ carbocyclic group, b is 0 or an integer between 1 and 5, and G is a group represented by the following Formula 3a, or a group represented by the following Formula 3f,

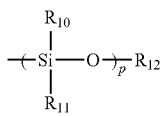

Formula 3a

In Formula 3a, $R_{10}$ to $R_{12}$ each independently represent hydrogen, a $C_1$-$C_{20}$ alkyl group, a $C_1$-$C_{20}$ alkyl group, a $C_6$-$C_{20}$ aryl group, a $C_2$-$C_{20}$ carbocyclic group, or a $C_2$-$C_{20}$ heterocyclic group, and —Si$_k$O$_{1.5k}$(R$^{13}$)$_a$(R$^{14}$)$_b$(R$^{15}$)$_c$    Formula 3f In Formula 3f, $R^{13}$, $R^{14}$, and $R^{15}$ each independently represent hydrogen, a substituted or unsubstituted $C_1$-$C_{20}$ alkyl group, a substituted or unsubstituted $C_1$-$C_{20}$ heteroalkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group, and k=a+b+c and 6≤k≤20.

A weight-average molecular weight of the polymer according to the embodiment of the present disclosure is about 10,000 Daltons or more, for example, about 10,000 Daltons to about 500,000 Daltons, and for example, 15,000 Daltons to about 100,000 Daltons. Since a desired degree of polymerization of the polymer having a weight-average molecular weight within the above range may be controlled, an electrolyte having excellent mechanical strength and electrochemical stability as well as improved ionic conductivity and lithium ion mobility may be obtained.

The degree of polymerization of the polymer according to the embodiment of the present disclosure, for example, is in a range of about 2 to about 5,000.

The polymer according to the embodiment of the present disclosure may have various forms such as a block copolymer, a random copolymer, an alternating copolymer, and a graft copolymer.

The polymer according to the embodiment of the present disclosure, for example, may be one of polymers represented by Formulae 5 to 8 below.

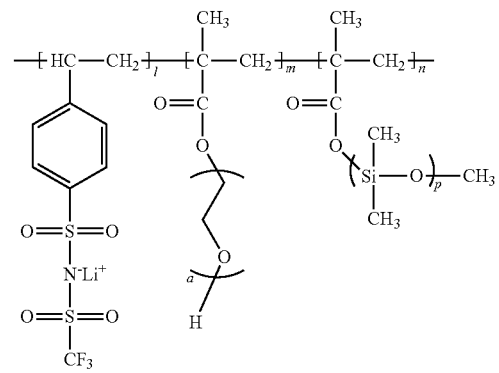

Formula 5

In Formula 5, a is an integer between 1 and 20,
p is a number between 1 and 5, and
l is between 0.1 and 0.3 (0.1≤l≤0.3), m is between 0.4 and 0.6 (0.4≤m≤0.6), n is between 0.2 and 0.4 (0.2≤n≤0.4), and a sum of l, m, and n is 1 (l+m+n=1),

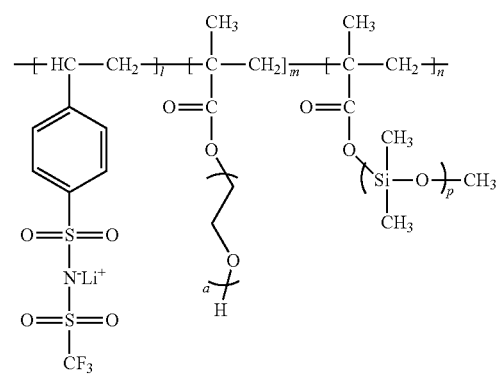

In Formula 5a, a is an integer between 1 and 20,
p is a number between 1 and 5, and
l is between 0.1 and 0.3 (0.1≤l≤0.3), m is between 0.4 and 0.6 (0.4≤m≤0.6), n is between 0.2 and 0.4 (0.2≤n≤0.4), and a sum of l, m, and n is 1 (l+m+n=1), Formula 6

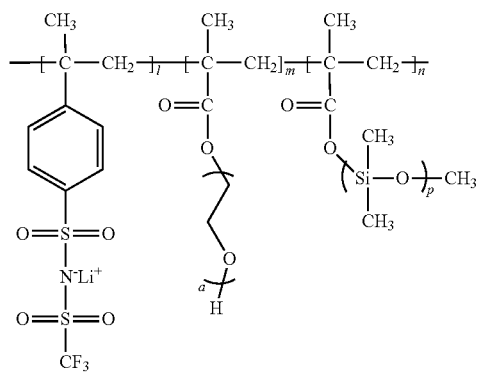

In Formula 6, a is an integer between 1 and 20,
p is a number between 1 and 5,
l is between 0.1 and 0.3 (0.1≤l≤0.3), m is between 0.4 and 0.6 (0.4≤m≤0.6), n is between 0.2 and 0.4 (0.2≤r≤0.4), and a sum of l, m, and n is 1 (l+m+n=1), Formula 7

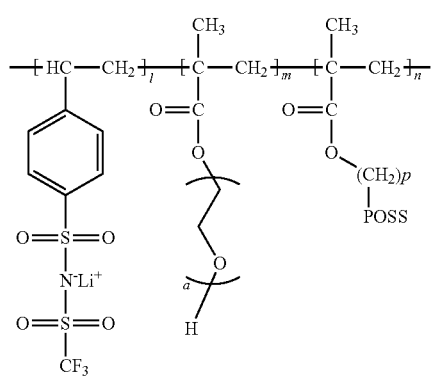

Formula 8

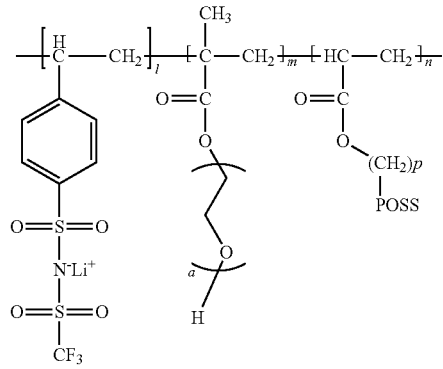

In Formulae 7 and 8, a and p are integers between 1 and 5, and POSS is selected from groups represented by Formulae 3b to 3d below.

Formula 3b

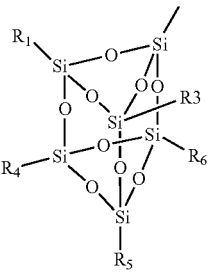

In Formula 3b, $R_1$, $R_3$, $R_4$, $R_5$ to $R_6$ represent a methyl group, an ethyl group, a propyl group, an isopropyl group, a butyl group, or an isobutyl group.

Formula 3c

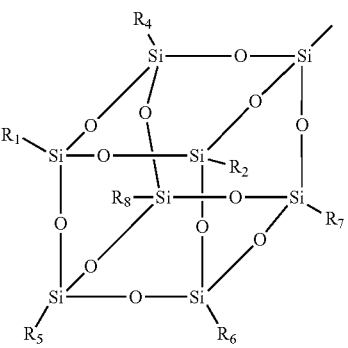

In Formula 3c, $R_1$, $R_2$, $R_4$ to $R_8$ represent a methyl group, an ethyl group, a propyl group, an isopropyl group, a butyl group, or an isobutyl group, and Formula 3d

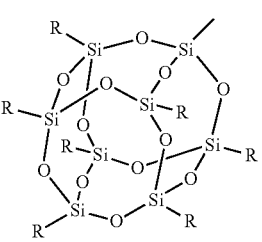

in Formula 3d, R represents a methyl group, an ethyl group, a propyl group, an isopropyl group, a butyl group, or an isobutyl group.

The polymer according to the embodiment of the present disclosure is a polymer represented by Formula 5c below.

Formula 5c

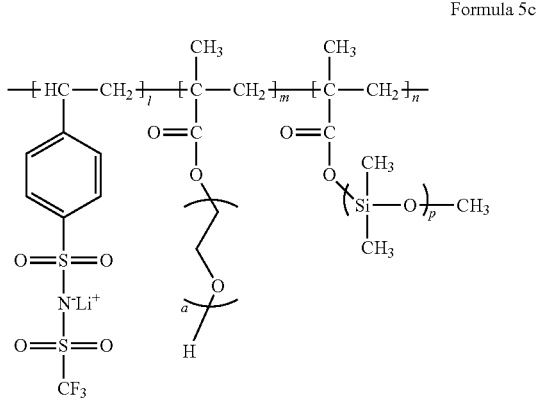

In Formula 5c, l, m, n, a, and p respectively may be as follows:
i) l is 0.2, m is 0.5, n is 0.3, a is 1, and p is 1,
ii) l is 0.2, m is 0.6, n is 0.2, a is 3, and p is 3,
iii) l is 0.3, m is 0.6, n is 0.1, a is 3, and p is 3, or
iv) l is 0.2, m is 0.4, n is 0.4, a is 3, and p is 3.

The polymer is a copolymer. For example, the polymer may be a random copolymer or block copolymer.

According to another aspect of the present disclosure, an electrolyte including the above-described polymer is provided.

A conductivity of the electrolyte may be about $8 \times 10^{-7}$ Siemens per centimeter (S/cm) or more, for example, about $8.5 \times 10^{-7}$ S/cm to about $3.3 \times 10^{-6}$ S/cm, at room temperature (about 25° C.). Since a lithium ion mobility of the electrolyte is greater than about 0.90 and, for example, is in a range of about 0.91 to about 0.94, both ionic conductivity and lithium ion mobility are excellent.

An operational effect of a lithium secondary battery including an electrolyte according to an embodiment of the present disclosure will be described with reference to FIGS. 1A to 1C.

FIG. 1A illustrates a lithium battery including a typical electrolyte which is formed by including polyethylene oxide and lithium bis(trifluoromethanesulfonyl)imide (LiTFSI) as a lithium salt. In the lithium battery, ionic conductivity is excellent due to the presence of the lithium salt. However, since lithium ions and anions coexist in an electrolyte 12 that is disposed between a cathode 10 and an anode 11, the TFSI⁻ anions may block the movement of the lithium ions. Thus, when the TFSI⁻ anions are present, lithium ion mobility may be very low. Also, the battery lifetime may be reduced due to side reactions of the anions constituting the lithium salt in the cathode and the anode, and therefore, an electrolyte with improved properties is desired.

Figure 1B:
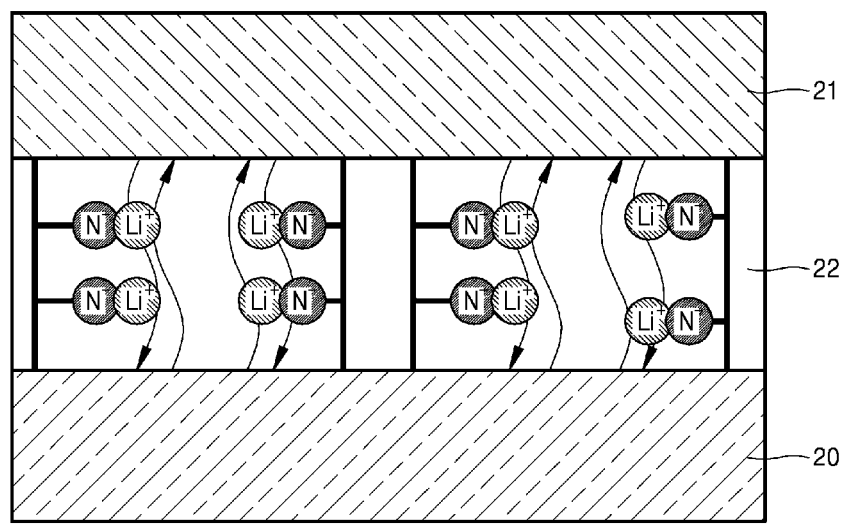

In contrast, as illustrated in FIG. 1B, when an electrolyte 22 according to an embodiment of the present disclosure is disposed between a cathode 20 and an anode 21, a polymer constituting the electrolyte has a structure in which LiTFSI is directly bonded, and therefore, fixed to a polymer side chain. Thus, excellent conductivity may be obtained when the lithium ion mobility is improved due to the smooth movement of lithium ions. As a result, the polymer having a glass transition temperature of room temperature (about 25° C.) or less as well as excellent thermal stability is formed by including the third repeating unit represented by Formula 3, which makes durability and mechanical properties of the electrolyte excellent.

Figure 1C:
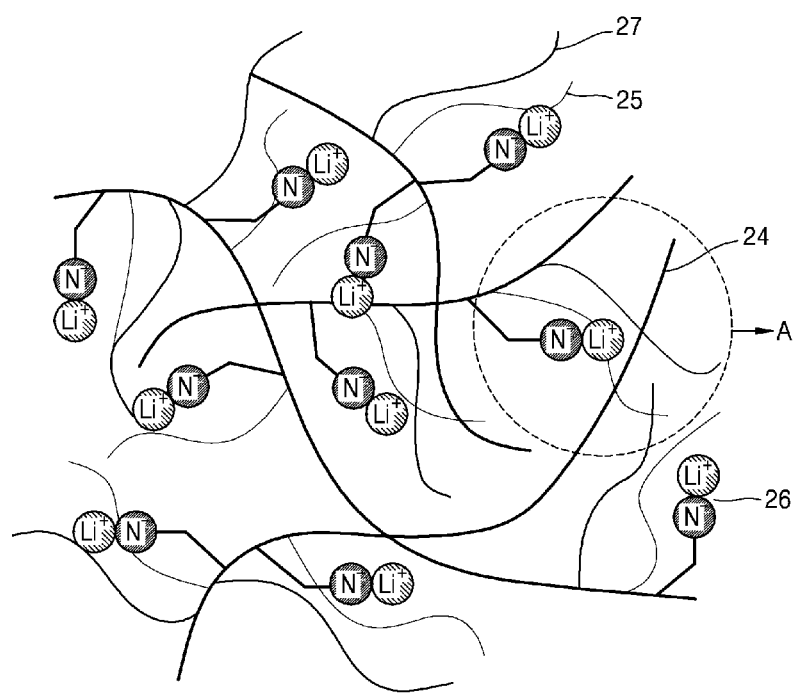

FIG. 1C schematically illustrates the polymer represented by Formula 1, i.e., the polymer constituting the electrolyte 22 of FIG. 1B.

Referring to FIG. 1C, lithium solubility in the polymer according to the embodiment of the present disclosure may be increased by introducing a polyethylene glycol acrylate side chain represented by the Formula 2 in comparison to polyethylene oxide which is a typical polymer for forming an electrolyte. The polymer contains a hydrophilic side chain 25, such as polyethylene oxide, and a hydrophobic main chain 24 such as polyethylene. A microphase is separated by the combination of the hydrophilic side chain and the hydrophobic main chain to form a rubbery solid. The polymer according to the embodiment of the present disclosure may have excellent conductivity as well as improved lithium ion mobility by including single ion conductors 26. Also, the polymer may include side chains 27 which contribute to improved conductivity and mechanic strength. Herein, the side chain 27 with improved conductivity and mechanical strength represents a side chain of the third repeating unit represented by Formula 3. Dotted circle region A in FIG. 1C denotes a polymer including the first repeating unit represented by Formula 1, the second repeating unit represented by Formula 2, and the third repeating unit represented by Formula 3.

The electrolyte according to the embodiment of the present disclosure may further include at least one inorganic particle selected from $SiO_2$, $TiO_2$, $ZrO_2$, $HfO_2$, ZnO, $Al_2O_3$, $BaTiO_3$, cage-structured silsesquioxane, and a metal-organic framework (MOF). An electrolyte having improved mechanical properties may be prepared when the inorganic particles are further included. An average particle diameter of the inorganic particles may be about 100 nanometers (nm) or less. For example, a particle diameter of the inorganic particles may be in a range of about 1 nm to about 100 nm. For example, the particle diameter of the inorganic particles may be in a range of about 5 nm to about 100 nm. For example, the particle diameter of the inorganic particles may be in a range of about 10 nm to about 100 nm. For example, the particle diameter of the inorganic particles may be in a range of about 10 nm to about 70 nm. For example, the particle diameter of the inorganic particles may be in a range of about 30 nm to about 70 nm. While not wishing to be bound by a theory, it is believed that when the particle diameter of the inorganic particles is within the above range, an electrolyte having excellent mechanical properties as well as excellent film formability may be prepared without degradation of ionic conductivity.

The metal-organic framework is a porous crystalline compound that is formed by chemical bonding of metal ions of Groups 4 to 15 or metal ion clusters of Groups 4 to 15 with an organic ligand.

The metal ions of Groups 4 to 15 may include at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi).

The organic ligand denotes an organic group to which chemical bonding, such as coordination bonding, ionic bonding, or covalent bonding, is possible. For example, an organic group having two or more bondable sites to the above-described metal ion may be combined with metal ions to form a stable structure. For example, the organic group is a group which is derived from at least one selected from compounds having at least one functional group that is selected from aromatic dicarboxylic acid, aromatic tricarboxylic acid, an imidazole compound, a tetrazole compound, 1,2,3-triazole, 1,2,4-triazole, pyrazole, aromatic sulfonic acid, aromatic phosphoric acid, aromatic sulfinic acid, aromatic phosphinic acid, bipyridine, an amino group, an imino group, an amide group, a methane dithiol (—CH(SH)$_2$) group, a methane dithiol anion (—CH(SH)S$^-$) group, a pyridine group, and a pyrazine group.

The above-described aromatic dicarboxylic acid or aromatic tricarboxylic acid may include benzene dicarboxylic acid, benzene tricarboxylic acid, biphenyl dicarboxylic acid, and triphenyl dicarboxylic acid.

For example, the above-described organic ligand may be a group derived from a compound represented by Formula 9 below.

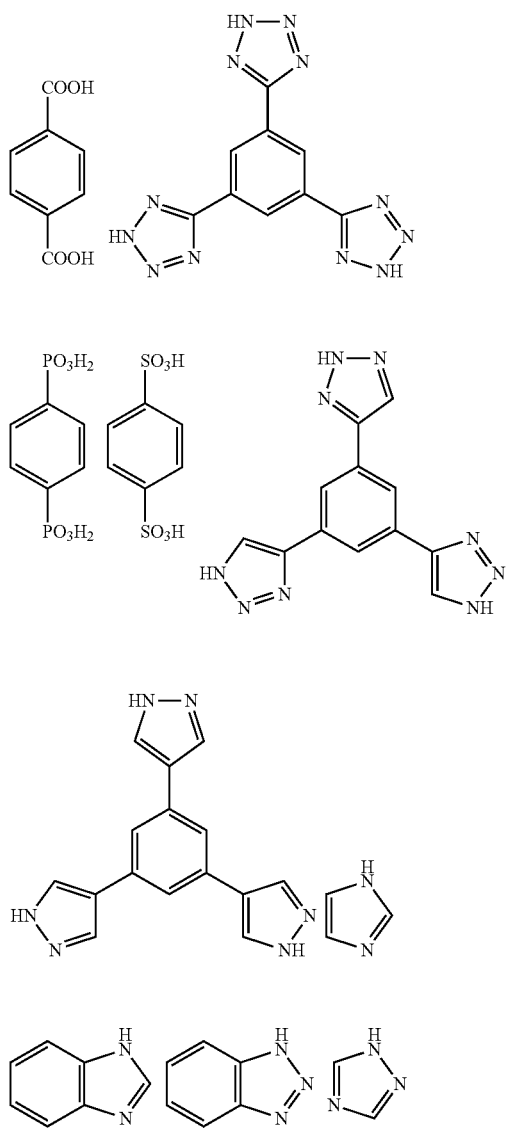
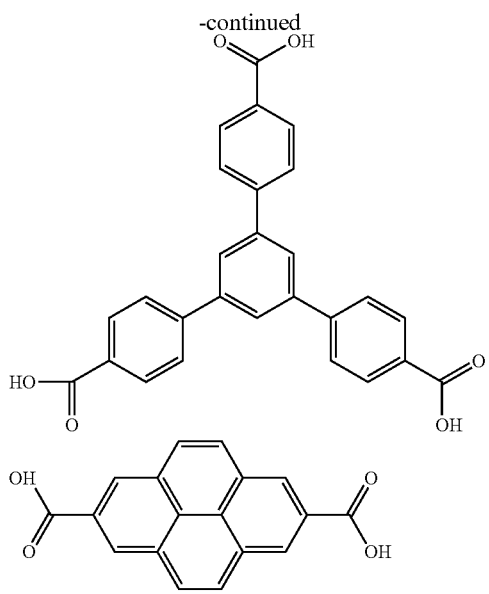

The metal-organic framework, for example, may include Ti$_8$O$_8$(OH)$_4$[O$_2$C—C$_6$H$_4$—CO$_2$]$_6$, Cu(bpy)(H$_2$O)$_2$(BF$_4$)$_2$(bpy){bpy=4,4'-bipyridine}, Zn$_4$O(O$_2$C—C$_6$H$_4$—CO$_2$)$_3$ (Zn-terephthalic acid-MOF, Zn-MOF), or Al(OH){O$_2$C—C$_6$H$_4$—CO$_2$}.

The electrolyte may further include an ionic liquid.

The ionic liquid denotes a salt, which exists in a liquid state at room temperature or room-temperature molten salt which has a melting temperature of room temperature or less, and which is composed of only ions. The ionic liquid is one selected from compounds including:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination (mixture) thereof, and ii) at least one anion selected from BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, SO$_4^-$, PF$_6^-$, (C$_2$F$_5$SO$_2$)$_2$N$^-$, (C$_2$F$_5$SO$_2$)(CF$_3$SO$_2$)N$^-$, (CF$_3$SO$_2$)$_2$N$^-$, NO$_3^-$, Al$_2$Cl$_7^-$, CH$_3$COO$^-$, (CF$_3$SO$_2$)$_3$C$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, and (O(CF$_3$)$_2$C$_2$(CF$_3$)$_2$O)$_2$PO$^-$ The ionic liquid, for example, may be at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)amide, and 1-ethyl-3-methyl imidazolium bis(trifluoromethylsulfonyl)amide.

An amount of the ionic liquid is in a range of about 5 parts by weight to about 40 parts by weight, for example, about 10 parts by weight to about 20 parts by weight, based on 100 parts by weight of the polymer constituting the electrolyte. While not wishing to be bound by a theory, it is believed that when the amount of the ionic liquid is within the above range, an electrolyte having excellent ionic conductivity and mechanical properties may be obtained.

The above-described electrolyte may be prepared in the form of a free-standing layer.

In the polymer according to the embodiment of the present disclosure, a molar ratio of lithium included in the repeating unit of Formula 1 to the ethylene oxide unit of the repeating unit of Formula 2 is controlled to be in a range of about 1:5 to about 1:30, for example, about 1:10 to about 1:20. While not wishing to be bound by a theory, it is believed that when the amounts of the lithium and the ethylene oxide unit are within the above ranges, the ionic conductivity of the electrolyte is excellent.

When the electrolyte contains the ionic liquid, a molar ratio (IL/Li) of the ionic liquid (IL) to lithium ions (Li) in the first repeating unit represented by Formula 1 may be in a range of about 0.1 to about 2.0, for example, about 0.2 to about 1.8, and for example, about 0.4 to about 1.5. The electrolyte having the above molar ratio range may not only have excellent lithium ion mobility and ionic conductivity, but may also have excellent mechanical properties. Thus, the electrolyte may effectively suppress the growth of lithium dendrites on the surface of the anode.

The electrolyte may be used as a solid polymer electrolyte for an all-solid battery, and may be used as an electrolyte for a lithium secondary battery such as a lithium-sulfur battery, a lithium-air battery, a lithium-ion battery, and a lithium polymer battery.

The electrolyte according to the embodiment of the present disclosure may be used as a polymer electrolyte for a lithium secondary battery, for example, a lithium metal battery. The electrolyte is suitable for a lithium metal protective layer. When the electrolyte is used, the reactivity between the liquid electrolyte and a lithium electrode may be reduced and uniform current and ion distribution may be obtained to delay the growth of dendrites. Thus, durability of the lithium metal battery may be improved when the instant electrolyte is used.

The electrolyte may be a mixed electrolyte type by further including at least one selected from a liquid electrolyte, a solid electrolyte, a gel electrolyte, a polymer ionic liquid, and a separator.

In the lithium secondary battery, the electrolyte may further include at least one selected from a liquid electrolyte, a polymer ionic liquid, a solid electrolyte and a gel electrolyte. At least one selected from a liquid electrolyte, a polymer ionic liquid, a gel electrolyte, a solid electrolyte, and a separator may be disposed between the cathode and the polymer electrolyte. Thus, when the electrolyte further includes at least one selected from a liquid electrolyte, a polymer ionic liquid, a solid electrolyte and a gel electrolyte, ionic conductivity and mechanical properties of the polymer electrolyte may be further improved.

The liquid electrolyte may further include at least one selected from an organic solvent, an ionic liquid, and a lithium salt.

The organic solvent may include a carbonate compound, a glyme compound, and a dioxolane compound.

The carbonate solvent includes ethylene carbonate, propylene carbonate, dimethyl carbonate, fluoroethylene carbonate, diethyl carbonate, or ethylmethyl carbonate. The glyme solvent includes at least one selected from poly (ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaureate (PEGDL), poly(ethylene glycol) monoacrylate (PEGMA), and poly(ethylene glycol) diacrylate (PEGDA).

Examples of the dioxolane compound may be at least one selected from 3-dioxolane, 4,5-diethyl-dioxolane, 4,5-dimethyl-dioxolane, 4-methyl-1,3-dioxolane, and 4-ethyl-1,3-dioxolane.

The organic solvent may include 2,2-dimethoxy-2-phenylacetophenone, dimethoxyethane, diethoxyethane, tetrahydrofuran, and γ-butyrolactone.

Any one obtained by polymerization of an ionic liquid monomer or a compound obtained in a polymer type may be used as the polymer ionic liquid. The polymer ionic liquid may have high solubility in the organic solvent and may further improve ionic conductivity when being added to the electrolyte.

When a polymer ionic liquid is obtained by polymerization of the above-described ionic liquid monomer, the resultant product having the polymerization reaction completed is subjected to washing and drying. Then, the polymer ionic liquid is prepared to have an appropriate anion capable of providing solubility in the organic solvent through an anion substitution reaction.

The polymer ionic liquid according to an embodiment of the present disclosure may contain a repeating unit including:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination (mixture) thereof; and (ii) at least one anion selected from $BE_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $PF_6^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

According to another embodiment of the present disclosure, the polymer ionic liquid may be prepared by polymerization of an ionic liquid monomer. The ionic liquid monomer may have the above-described anion and at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination (mixture) thereof while having a polymerizable functional group such as a vinyl group, an aryl group, an acrylate group, and a methacrylate group.

Examples of the ionic liquid monomer may be 1-vinyl-3-ethylimidazolium bromide and a compound represented by Formula 10 or 11 below.

Formula 10

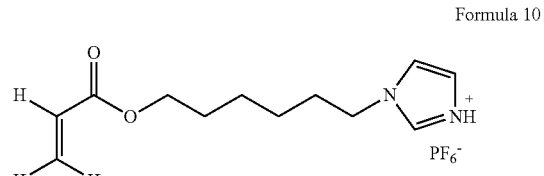

Formula 11

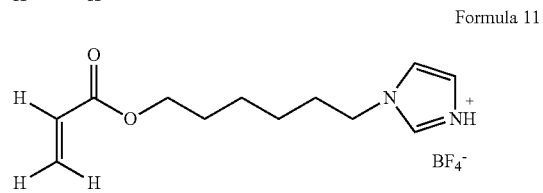

Examples of the polymer ionic liquid may be a compound represented by Formula 12 below or a compound represented by Formula 13 below.

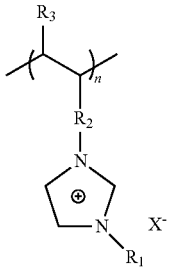

Formula 12

In Formula 12, $R_1$ and $R_3$ each independently represent hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, and a substituted or unsubstituted $C_4$-$C_{30}$ carbocyclic group. In Formula 12, $R_2$ simply represents a chemical bond, or represents a $C_1$-$C_3$ alkylene group, a $C_6$-$C_{30}$ arylene group, a $C_2$-$C_{30}$ heteroarylene group, or a $C_4$-$C_{30}$ carbocyclic group, $X^-$ represents an anion of the ionic liquid, and n is between 500 and 2,800.

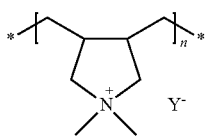

Formula 13

In Formula 13, $Y^-$ is defined as the same as $X^-$ in Formula 1, and n is between 500 and 2,800.

In Formula 13, $Y^-$, for example, may be bis(trifluoromethanesulfonyl)imide (TFSI), $BF_4$, or $CF_3SO_3$.

The polymer ionic liquid, for example, may include a cation selected from poly(1-vinyl-3-alkylimidazolium), poly(1-allyl-3-alkylimidazolium), and poly(1-(methacryloyloxy)-3-alkylimidazolium), and an anion selected from $CH_3COO^-$, $CF_3COO^-$, $CH_3SO_3^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

The compound represented by Formula 13 may include polydiallyldimethylammonium bis(trifluoromethanesulfonyl)imide.

According to another embodiment of the present disclosure, the polymer ionic liquid may include a low molecular weight polymer, a thermally stable ionic liquid, and a lithium salt. The low molecular weight polymer may have an ethylene oxide chain. The low molecular weight polymer may be glyme. Herein, the glyme, for example, may include poly(ethylene glycol) dimethyl ether (polyglyme), tetraethylene dimethyl ether (tetraglyme), tri(ethylene glycol) dimethyl ether (triglyme), or a combination thereof.

A weight-average molecular weight of the low molecular weight polymer is in a range of about 75 to about 2,000 Daltons, for example, about 250 to about 500 Daltons. The thermally stable ionic liquid is the same as defined in the above-described ionic liquid. Any compound, in which an alkali metal in the above-described alkali metal salt is lithium, may be used as the lithium salt.

The conductivity may be further improved when the gel electrolyte is further included.

The gel electrolyte is an electrolyte in the form of a gel and any electrolyte may be used as long as it is known in the art.

The gel electrolyte, for example, may include a polymer and a polymer ionic liquid.

The solid electrolyte may be an organic solid electrolyte or an inorganic solid electrolyte.

Examples of the organic solid electrolyte may be a polyethylene derivative, a polyethylene oxide derivative, a polypropylene oxide derivative, a phosphate ester polymer, polyester sulfide, polyvinyl alcohol, polyvinylidene fluoride, a polymer including an ionic dissociation group, etc. Examples of the inorganic solid electrolyte may be $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, sodium (Na)-silicates, $Li_{0.3}La_{0.5}TiO_3$, $Na_5MSi_4O_{12}$ (wherein M is a rare earth element such as neodymium (Nd), gadolinium (Gd), and dysprosium (Dy)), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 \leq x \leq 0.8$, $0 \leq y \leq 1.0$, and M is Nd, samarium (Sm), europium (Eu), Gd, terbium (Tb), Dy, holmium (Ho), erbium (Er), thulium (Tm), or ytterbium (Yb)), $Li_{1+x+y}Q_xTi_{2-x}Si_yP_{3-y}O_{12}$ (wherein $0 \leq x \leq 0.4$, $0 \leq y \leq 0.6$, and Q is Al or gallium (Ga)), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), $Li_{7+x}A_xLa_{3-x}Zr_2O_{12}$ (wherein $0<x<3$ and A is Zn), etc.

The electrolyte according to the embodiment of the present disclosure may have the form of a solid or a gel. A thickness of the electrolyte is about 200 micrometers (μm) or less, and such electrolyte for example, may be prepared in the form of a layer, a film, or a sheet having a thickness of about 0.1 μm to about 100 μm, for example, about 1 μm to about 40 μm. In order to prepare the polymer electrolyte in the form of a sheet, a film, or a layer, a known technique, such as spin coating, roll coating, curtain coating, extrusion, casting, screen printing, and inkjet printing, may be used.

The electrolyte according to the embodiment of the present disclosure may have improved mechanical properties as well as improved stability with respect to the liquid electrolyte while having excellent ionic conductivity and lithium ion mobility. The electrolyte may be used as a lithium metal protective layer, and when the electrolyte is used, limitations in lifetime and safety of the lithium secondary battery due to the formation of dendrites caused by high reactivity of lithium may be prevented in advance. Thus, when the electrolyte according to the embodiment of the present disclosure is included, a lithium secondary battery having an improved capacity retention rate may be prepared.

Hereinafter, a method of preparing the polymer according to the embodiment of the present disclosure and the electrolyte including the polymer will be described.

A compound represented by the following Formula 1a and a compound represented by the following Formula 2a were mixed with, a compound represented by the following Formula 3e to prepare a composition for forming a polymer.

A polymerization reaction of the composition is performed. The polymerization reaction is performed by applying heat or light.

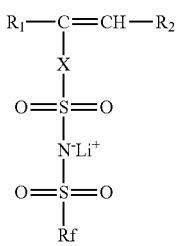

Formula 1a

In Formula 1a, $R_1$, $R_2$, and $R_f$ are the same as those defined in Formula 1.

In Formula 1a, X may be phenylene or —C(=O)O(CH$_2$)$_n$— (where n is an integer between 1 and 5).

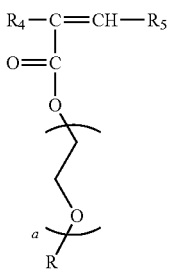

Formula 2a

In Formula 2a, $R_4$, $R_5$, R, and a are the same as those defined in Formula 2.

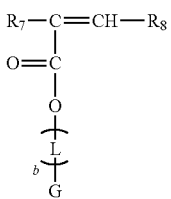

Formula 3e

In Formula 3e, $R_7$, $R_8$, G, and b are the same as those defined in Formula 3.

A polymerization initiator and a solvent are added to the composition.

A photopolymerization initiator or thermal polymerization initiator may be used as the polymerization initiator. The photopolymerization initiator may be used without any limitation on its configuration as long as it is capable of forming a radical upon exposure to light such as ultraviolet rays. Examples of the photopolymerization initiator may include at least one selected from 2-hydroxy 2-methyl-1-phenyl-propane-1-on (HMPP), benzoin ether, dialkyl acetophenone, hydroxyl alkylketone, phenyl glyoxylate, benzyl dimethyl ketal, acyl phosphine, and α-aminoketone. As a specific example of the acyl phosphine, commercial lucirin TPO, i.e., 2,4,6-trimethyl-benzoyl-trimethyl phosphine oxide, may be used.

At least one selected from a persulfate initiator, an azo initiator, hydrogen peroxide, and ascorbic acid may be used as the thermal polymerization initiator. For example, examples of the persulfate initiator may be sodium persulfate (Na$_2$S$_2$O$_8$), potassium persulfate (K$_2$S$_2$O$_8$), and ammonium persulfate ((NH$_4$)$_2$S$_2$O$_8$), and examples of the azo initiator may be 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, and 4,4-azobis-(4-cyanovaleric acid).

The polymerization initiator may be included in an amount of about 0.005 part by weight to about 5.0 parts by weight based on 100 parts by weight of the compound represented by Formula 1a. While not wishing to be bound by a theory, it is believed that when the amount of the polymerization initiator is within the above range, the reactivity of the polymerization reaction is excellent.

In the above-described process, the light may be ultraviolet (UV) ray. When the polymerization is performed using the light as described above, deformation of a lithium metal thin film by heat may be prevented in advance when an electrolyte is formed on the lithium metal thin film.

Although time for performing the polymerization (crosslinking) by applying light or heat is variable, the time, for example, may be in a range of about 1 minute to about 30 minutes. When an electrolyte in the form of a layer is formed by using an electrolyte composition, a layer is formed on a base by coating and drying the electrolyte composition on the base, and the electrolyte may be prepared by separating the layer from the base.

Any method may be used as the coating method as long as it may be typically used in the formation of an electrolyte. For example, a method, such as spin coating, roll coating, curtain coating, extrusion, casting, screen printing, inkjet printing, and doctor blade, may be used.

An organic solvent may be added to the electrolyte composition. Any organic solvent may be used as long as it is used in the art. Examples of the organic solvent may be tetrahydrofuran, N-methylpyrrolidone, acetonitrile, benzonitrile, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and combinations (mixtures) thereof. An amount of the organic solvent may be in a range of about 100 parts by weight to about 3,000 parts by weight based on 100 parts by weight of the compound represented by Formula 1a.

The polymerization reaction is performed at a temperature of about 30° C. to about 80° C., for example, about 40° C., and a reaction time may vary depending on the reaction temperature. For example, the polymerization reaction is performed for about 8 hours to about 20 hours, for example, about 15 hours.

According to the above-described preparation method, the polymer according to the embodiment of the present disclosure may be prepared at low cost, and mass production may be possible due to convenience of preparation of the polymer.

The compound represented by Formula 1a is prepared according to the following process.

First, a compound represented by Formula 14 is reacted with a compound represented by Formula 15 and a base to obtain a compound represented by Formula 16. The reaction temperature is in a range of about 30° C. to about 80° C.

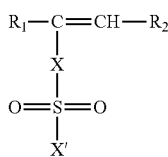

Formula 14

In Formula 14, $R_1$, $R_2$, and X are the same as those defined in Formula 1, and X' is a halogen atom.

The halogen atom, for example, is chlorine (Cl), bromine (Br), or iodine (I).

Pyridine is used as the base.

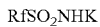

Formula 15

In Formula 15, $R_f$ is the same as that defined in Formula 1.

The compound represented by Formula 15, for example, may include $CF_3SO_2NHK$.

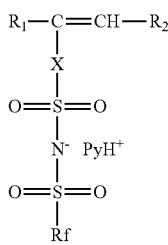

Formula 16

In Formula 16, $R_1$, $R_2$, $R_f$, and X are the same as those defined in Formula 1, and Py represents pyridine.

The compound represented by Formula 16 is reacted with a potassium containing salt, such as potassium carbonate, to obtain a compound represented by Formula 17. The reaction temperature is in a range of about 25° C. to about 60° C.

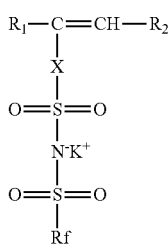

Formula 17

In Formula 17, $R_1$, $R_2$, $R_f$, and X are the same as those defined in Formula 1.

The compound represented by Formula 17 is reacted with a lithium salt, such as $LiClO_4$, to substitute potassium ions with lithium ions, and thus, the compound represented by Formula 1a may be obtained. The reaction temperature is in a range of about 25° C. to about 60° C.

The electrolyte according to the embodiment of the present disclosure may be electrochemically stable in a voltage range of about 0 Volts (V) to about 5.5 V, for example, about 0 V to about 5.0 V, and for example, about 0 V to about 4.0 V versus lithium. The electrolyte according to the embodiment of the present disclosure may be used in an electrochemical device operating at high voltage by having an electrochemically stable, wide voltage window.

A current density of the electrolyte due to side reactions other than intercalation/deintercalation of lithium near 0 V versus lithium may be about 0.05 milliAmperes per square centimeter ($mA/cm^2$) or less, for example, about 0.02 $mA/cm^2$ or less, and for example, about 0.01 $mA/cm^2$ or less.

For example, a current density of the electrolyte due to an oxidation reaction near 5.0 V versus lithium may be about 0.05 $mA/cm^2$ or less, for example, about 0.04 $mA/cm^2$ or less, and for example, about 0.02 $mA/cm^2$ or less.

According to another aspect of the present disclosure, provided is a lithium secondary battery including:

a cathode, an anode, and an electrolyte disposed between the cathode and the anode.

Since lithium secondary batteries have high voltage, high capacity, and high energy density, the lithium secondary batteries have been widely used in fields such as mobile phones, notebooks, batteries for power generation such as wind or solar power generation, electric vehicles, uninterruptible power supplies, and household batteries.

FIGS. 2A to 2D schematically illustrate a structure of a lithium secondary battery including the electrolyte according to the embodiment of the present disclosure.

Figure 2A:
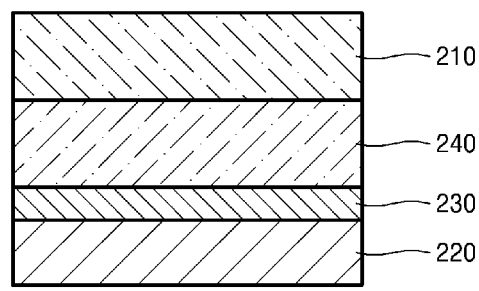
FIGS. 2A to 2D schematically illustrate a structure of a lithium secondary battery according to an exemplary embodiment of the present disclosure.

As illustrated in FIG. 2A, the lithium secondary battery has a structure in which an electrolyte 230 is disposed between a cathode 210 and an anode 220. An intermediate layer 240 may be further included between the electrolyte 230 and the cathode 210. The intermediate layer 240 has a different composition from the electrolyte 230, and may further include at least one selected from a liquid electrolyte, a polymer ionic liquid, a solid electrolyte, a gel electrolyte, and a separator.

Since the above-described electrolyte 230 is disposed on at least a portion of the anode 220, a surface of the anode 220 may be electrochemically stabilized while being mechanically stabilized. Thus, the formation of dendrites on the surface of the anode during charge and discharge of the lithium secondary battery may be suppressed and interfacial stability between the anode and the electrolyte may be improved. Therefore, cycle characteristics of the lithium secondary battery may be improved.

Since the electrolyte may completely cover the surface of the anode, the electrolyte may act as a protective layer protecting the surface of the anode. For example, the electrolyte may prevent a direct contact between the anode and an electrolyte which is disposed between the electrolyte and the cathode and has high reactivity with the surface of the anode. Thus, the electrolyte may protect the anode to increase the stability of the anode.

Figure 2B:
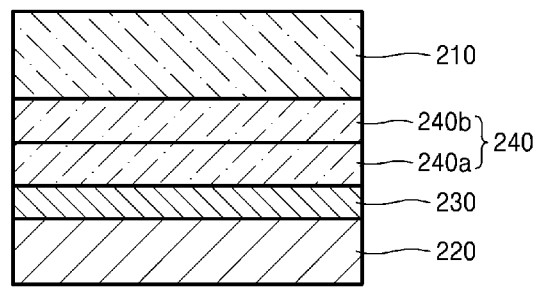

As illustrated in FIG. 2B, the intermediate layer 240 may have a two-layer structure in which a liquid electrolyte 240a and a solid electrolyte 240b are sequentially stacked. Herein, the liquid electrolyte may be adjacent to the electrolyte 230. Thus, the lithium secondary battery has a stacking sequence of anode/electrolyte/intermediate layer (liquid electrolyte/solid electrolyte)/cathode.

Figure 2C:
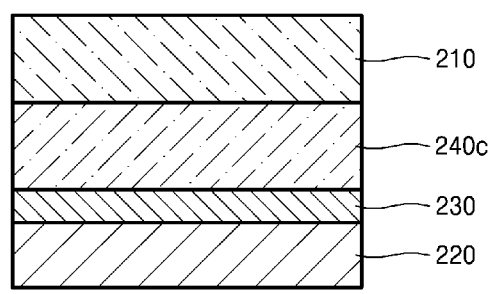

Referring to FIG. 2C, the lithium secondary battery according to an embodiment of the present disclosure may use a separator 240c as an intermediate layer. As the separator, polyethylene, polypropylene, polyvinylidene fluoride, or a multilayer of two or more layers thereof may be used, and a mixed multilayer, such as a polyethylene/ polypropylene double-layered separator, a polyethylene/polypropylene/polyethylene triple-layered separator, or a polypropylene/polyethylene/polypropylene triple-layered separator, may be used.

Figure 2D:
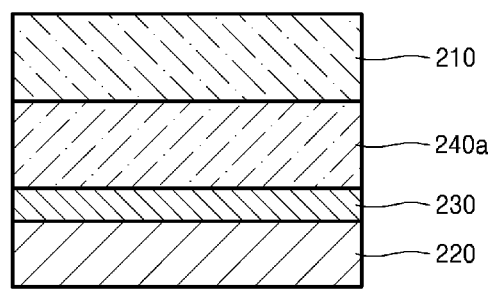

As illustrated in FIG. 2D, a liquid electrolyte 240*a* may be disposed as an intermediate layer of the lithium secondary battery according to the embodiment of the present disclosure. Herein, the liquid electrolyte may have the same or different composition from a liquid electrolyte which may be included in the electrolyte 230.

In FIGS. 2A to 2D, the cathode may be a porous cathode. The porous cathode includes pores, or a cathode in which a liquid electrolyte may penetrate into the cathode by a capillary phenomenon because the formation of pores is not excluded.

For example, the porous cathode includes a cathode which is obtained by coating and drying a cathode active material composition including a cathode active material, a conductive agent, a binder, and a solvent. The cathode thus obtained may include pores existing between cathode active material particles. A liquid electrolyte may be impregnated in the porous cathode.

According to another embodiment of the present disclosure, the cathode may include a liquid electrolyte, a gel electrolyte, and a solid electrolyte. Any liquid electrolyte, gel electrolyte, and solid electrolyte may be used as long as these may be used as an electrolyte of a lithium secondary battery in the art and do not degrade a cathode active material by reacting with the cathode active material during charge and discharge process.

In FIGS. 2A to 2D, a lithium metal thin film may be used as the anode. A thickness of the lithium metal thin film may be less than about 100 μm. For example, stable cycle characteristics of the lithium secondary battery may be obtained even if the thickness of the lithium metal thin film is less than about 100 μm. For example, the thickness of the lithium metal thin film in the lithium secondary battery may be about 80 μm or less, for example, about 60 μm or less, and for example, may be in a range of about 0.1 μm to about 60 μm. When the thickness of the lithium metal thin film is decreased to less than about 100 μm in a typical lithium secondary battery, a thickness of lithium, surface of which is degraded due to side reactions and the formation of dendrites, is increased. Thus, a lithium secondary battery providing stable cycle characteristics was difficult to be obtained. However, a lithium secondary battery having stable cycle characteristics may be prepared when the electrolyte according to the embodiment of the present disclosure is used.

Figure 3:
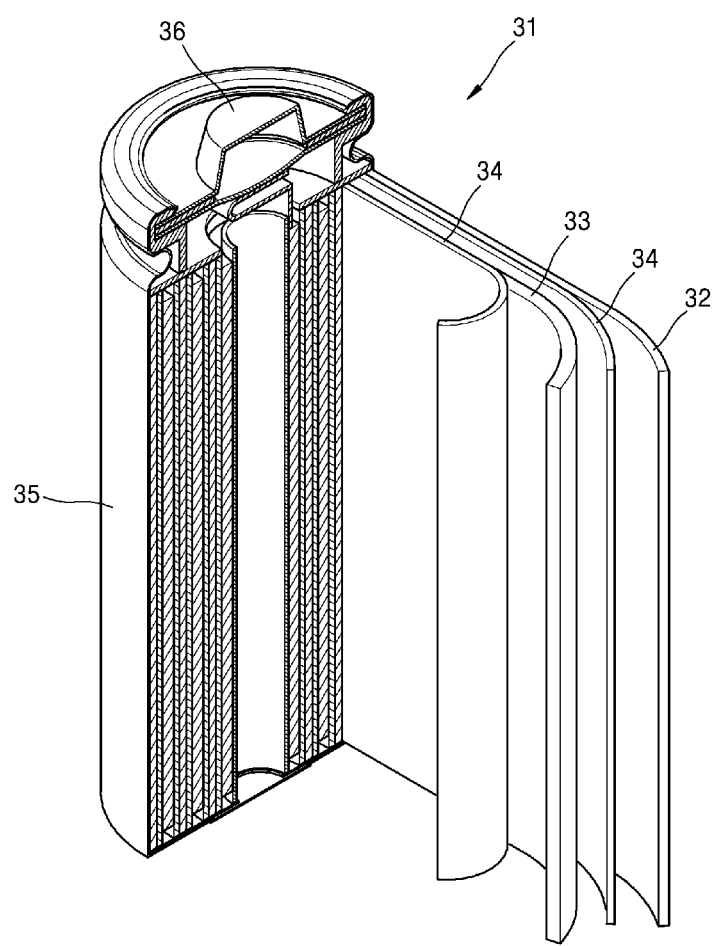
FIG. 3 is an exploded perspective view of a lithium secondary battery according to an exemplary embodiment of the present disclosure.

FIG. 3 schematically illustrates a structure of a lithium secondary battery according to another embodiment of the present disclosure.

Referring to FIG. 3, a lithium secondary battery 31 includes a cathode 33, an anode 32, and a separator 34 according to an embodiment of the present disclosure. The above-described cathode 33, anode 32, and separator 34 according to the embodiment of the present disclosure are wound or folded to be contained in a battery case 35. Subsequently, an electrolyte solution is injected into the battery case 35, and the lithium secondary battery 31 is completed by sealing with a cap assembly 36. The battery case 35 may be a cylindrical, rectangular, or thin-film type battery case. For example, the lithium secondary battery 31 may be a large thin-film type battery.

A separator is disposed between the cathode 33 and the anode 32 such that a battery structure may be formed. The battery structure is stacked in a bi-cell structure, and then impregnated in a liquid electrolyte. A lithium secondary battery may be completed when a product thus obtained is contained in a pouch and sealed.

The plurality of battery structures is stacked to form a battery pack. The battery pack may be used in all devices demanding high capacity. For example, the battery pack may be used in a notebook, a smartphone, or an electric vehicle.

The lithium secondary battery, for example, may include a lithium-air battery and a lithium-sulfur battery.

According to another aspect of the present disclosure, provided is a lithium secondary battery in which a cathode, an anode, and the above-described electrolyte disposed therebetween are included, and the anode is a lithium metal or lithium metal alloy electrode. Herein, the lithium secondary battery may be a lithium metal battery.

At least one selected from a liquid electrolyte, a gel electrolyte, a polymer electrolyte, a polymer ionic liquid, and a separator may be further included between the electrolyte and the cathode.

The electrolyte may act as a protective layer of a lithium metal or lithium metal alloy electrode. Since the electrolyte may perform its role without including an organic solvent such as a carbonate solvent, mechanical properties may be excellent. Also, since the electrolyte has excellent interfacial characteristics with a lithium metal when the electrolyte is stacked on the lithium electrode, the electrolyte may suppress the growth of lithium dendrites on the surface of the anode after charge and discharge and may have an excellent effect of suppressing the occurrence of a short circuit in the battery due to the occurrence of cracks in the electrolyte. Furthermore, the electrolyte is stable with respect to a liquid electrolyte.

An operating voltage of the lithium secondary battery according to the embodiment of the present disclosure may be in a range of about 4.0 V to about 5.0 V, for example, about 4.5 V to about 5.0 V.

At least one selected from a liquid electrolyte, a polymer ionic liquid, a solid electrolyte, and a gel electrolyte may be further included between the cathode and the electrolyte.

Each component which constitutes the lithium secondary battery including the electrolyte according to the embodiment of the present disclosure and a method of preparing the lithium secondary battery having the components will be described in more detail as follows.

As a cathode active material for preparing the cathode, the cathode active material may include at least one selected from lithium cobalt oxide, lithium nickel cobalt manganese oxide, lithium nickel cobalt aluminum oxide, lithium iron phosphate, and lithium manganese oxide. However, the cathode active material is not necessarily limited thereto and any cathode active material may be used as long as it is used in the art.

For example, a compound expressed as one of the following chemical formulas may be used: $Li_aA_{1-b}B'_bD'_2$ (wherein $0.90 \leq a \leq 1.8$, $0 \leq b \leq 0.5$); $Li_aE_{1-b}B'_bO_{2-c}D'_c$ (wherein $0.90 \leq a \leq 1.8$, $0 \leq b \leq 0.5$, $0 \leq c \leq 0.05$); $LiE_{2-b}B'_bO_{4-c}D_c$ (wherein $0 \leq b \leq 0.5$, $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, $0 < \alpha < 2$); $Li_aNi_bE_cG_dO_2$ (wherein $0.90 \leq a \leq 1.8$, $0 \leq b \leq 0.9$, $0 \leq c \leq 0.5$, $0.001 \leq d \leq 0.1$); $Li_aNi_bCo_c$-

Mn$_d$GeO$_2$ (wherein 0.90≤a≤1.8, 0≤b≤0.9, 0≤c≤0.5, 0≤d≤0.5, 0.001≤e≤0.1); Li$_a$NiG$_b$O$_2$ (wherein 0.90≤a≤1.8, 0.001≤b≤0.1); Li$_a$CoG$_b$O$_2$ (wherein 0.90≤a≤1.8, 0.001≤b≤0.1); Li$_a$MnG$_b$O$_2$ (wherein 0.90≤a≤1.8, 0.001≤b≤0.1); Li$_a$MnG$_b$O$_4$ (wherein 0.90≤a≤1.8, 0.001≤b≤0.1); QO$_2$; QS$_2$; LiQO$_2$; LiQS$_2$; V$_2$O$_5$; LiV$_2$O$_5$; LiI'O$_2$; LiNiVO$_4$; Li$_{(3-f)}$J$_2$(PO$_4$)$_3$ (wherein 0≤f≤2); Li$_{(3-f)}$Fe$_2$(PO$_4$)$_3$ (wherein 0≤f≤2); and LiFePO$_4$.

In the above chemical formulas, A is Ni, Co, Mn, or a combination thereof; B' is Al, Ni, Co, Mn, Cr, Fe, Mg, Sr, V, rare earth elements, or a combination thereof; D' is oxygen (O), fluorine (F), sulfur (S), phosphorus (P), or a combination thereof; E is Co, Mn, or a combination thereof; F is F, S, P, or a combination thereof; G is Al, Cr, Mn, Fe, Mg, lanthanum (La), cerium (Ce), Sr, V, or a combination thereof; Q is Ti, Mo, Mn, or a combination thereof; I' is Cr, V, Fe, Sc, Y, or a combination thereof; and J is V, Cr, Mn, Co, Ni, copper (Cu), or a combination thereof.

For example, a compound represented by the following Formula 18, a compound represented by the following Formula 19, or a compound represented by the following Formula 20 may be used as the cathode active material.

$$Li_aNi_bCo_cMn_dO_2 \qquad \text{Formula 18}$$

In Formula 18, 0.90≤a≤1.8, 0≤b≤0.9, 0≤c≤0.5, and 0≤d≤0.5.

$$Li_2MnO_3 \qquad \text{Formula 19}$$

$$LiMO_2 \qquad \text{Formula 20}$$

In Formula 20, M is Mn, Fe, Co, or Ni.

A cathode is prepared according to the following method.

A cathode active material composition is prepared in which a cathode active material, a binder, and a solvent are mixed. A conductive agent may be further added to the cathode active material composition.

A cathode plate may be prepared by directly coating and drying the cathode active material composition on a metal current collector. Alternatively, the cathode active material composition is cast on a separate support and a cathode plate may then be prepared by laminating a film detached from the support on the metal current collector.

The conductive agent, the binder, and the solvent in the cathode active material composition may be the same as those in an anode active material composition. Pores in an electrode plate may be formed by further adding a plasticizer to the cathode active material composition and/or the anode active material composition.

The cathode active material, conductive agent, binder, and solvent are included in amounts typically used in a lithium battery. One or more of the conductive agent, binder, and solvent may be omitted according to applications and configurations of lithium batteries.

The anode may be prepared in almost the same manner as the cathode except that an anode active material is used instead of the cathode active material in the above-described process of preparing a cathode.

A carbon material, silicon, silicon oxide, a silicon alloy, a silicon-carbon material composite, tin, a tin alloy, a tin-carbon composite, metal oxide, or a combination thereof may be used as the anode active material.

The carbon material may be crystalline carbon, amorphous carbon, or a combination (mixture) thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, fired coke, graphene, carbon black, fullerene soot, carbon nanotubes, carbon fibers, etc. However, the carbon material is not necessarily limited thereto and any carbon material may be used as long as it is used in the art.

Any one selected from Si, SiO$_x$ (wherein 0<x<2, for example, 0.5<x<1.5), Sn, SnO$_2$, a silicon-containing metal alloy, and a mixture thereof may be used as the anode active material. At least one selected from Al, Sn, Ag, Fe, Bi, Mg, Zn, In, Ge, Pb, and Ti may be used as a metal capable of forming the silicon alloy.

The anode active material may include metal/metalloid alloyable with lithium, an alloy thereof, or an oxide thereof. Examples of the metal/metalloid alloyable with lithium may be Si, Sn, Al, Ge, Pb, Bi, Sb, an Si—Y alloy (where Y is alkaline metal, alkaline earth metal, a Group 13 element, a Group 14 element, transition metal, a rare earth element, or a combined element thereof, and is not Si), an Sn—Y alloy (where Y is alkaline metal, alkaline earth metal, a Group 13 element, a Group 14 element, transition metal, a rare earth element, or a combined element thereof, and is not Sn), MnO (wherein 0<x≤2), etc. Examples of the element Y may be Mg, Ca, Sr, Ba, radium (Ra), Sc, Y, Ti, Zr, Hf, rutherfordium (Rf), V, Nb, Ta, dubnium (Db), Cr, Mo, W, seaborgium (Sg), technetium (Tc), Re, bohrium (Bh), Fe, Pb, Ru, Os, hassium (Hs), Rh, Ir, Pd, Pt, Cu, Ag, gold (Au), Zn, Cd, B, Al, Ga, Sn, In, Ge, P, As, Sb, Bi, S, selenium (Se), tellurium (Te), polonium (Po), and combinations thereof. For example, an oxide of the metal/metalloid alloyable with lithium may be lithium titanate, vanadium oxide, lithium vanadium oxide, SnO$_2$, SiO$_x$ (wherein 0<x<2), etc.

For example, a lithium anode thin film may be used as the anode.

The anode active material, conductive agent, binder, and solvent may be included in amounts typically used in a lithium secondary battery.

The electrolyte according to the embodiment of the present disclosure is used as an electrolyte.

In addition to the above-described electrolyte, a separator typically used in a lithium secondary battery and/or a lithium salt-containing non-aqueous electrolyte may be further included.

A thin insulating film having high ion permeability as well as mechanical strength is used as the separator. A pore diameter of the separator is generally in a range of about 0.01 μm to about 10 μm and a thickness thereof is generally in a range of about 5 μm to about 20 μm. For example, an olefin polymer such as polypropylene; and a sheet or nonwoven fabric formed of glass fibers or polyethylene may be used as the separator. When a solid polymer electrolyte is used as the electrolyte, the solid polymer electrolyte may also act as a separator.

Specific examples of the separator may be polyethylene, polypropylene, polyvinylidene fluoride, or a multilayer of two or more layers thereof, and a mixed multilayer, such as a polyethylene/polypropylene double-layered separator, a polyethylene/polypropylene/polyethylene triple-layered separator, or a polypropylene/polyethylene/polypropylene triple-layered separator, may be used.

The lithium salt-containing non-aqueous electrolyte is formed from a non-aqueous electrolyte and a lithium salt.

A non-aqueous electrolyte solution, an organic solid electrolyte, and an inorganic solid electrolyte are used as the non-aqueous electrolyte.

The non-aqueous electrolyte solution includes an organic solvent. Any suitable organic solvent may be used as long as it is known in the art. Examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and mixtures thereof.

Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and combinations (mixtures) thereof.

In order to improve charge and discharge characteristics and flame retardancy, pyridine, triethyl phosphite, triethanolamine, cyclic ester, ethylene diamine, n-glyme, hexamethylphosphoramide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may, for example, be added to the non-aqueous electrolyte. In some cases, in order to provide incombustibility, a halogen-containing solvent, such as carbon tetrachloride and ethylene trifluoride, may be further included.

Since the lithium secondary battery according to the embodiment of the present disclosure has excellent capacity and lifetime characteristics, the lithium secondary battery may not only be used in a battery cell, which is used as a power source of a small device, but may also be used as a unit cell in a medium and large sized battery pack or battery module including a plurality of battery cells, which is used as a power source of a medium and large sized device.

Examples of the medium and large sized device may be an electric vehicle (EV) including an electric car, a hybrid electric vehicle (HEV), and a plug-in hybrid electric vehicle (PHEV); an electric two-wheeled vehicle including an E-bike and an E-scooter; a power tool; and a power storage device, but the medium and large sized device is not limited thereto.

The expression "alkyl" in the present specification denotes a group derived from a fully saturated branched or unbranched (or straight or linear) hydrocarbon.

Non-limiting examples of the "alkyl" may include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the "alkyl" may be substituted with a halogen atom, a halogen atom-substituted C1-C20 alkyl group (e.g., $CCF_3$, $CHCF_2$, $CH_2F$, $CCl_3$, etc.), C1-C20 alkoxy, C2-C20 alkoxyalkyl, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The expression "halogen atom" includes fluorine, bromine, chlorine, and iodine.

The expression "heteroalkyl" in the present specification denotes an alkyl group as defined above, which includes at least one heteroatom covalently bonded to one or more carbon atoms of the alkyl group. Each heteroatom is independently chosen from nitrogen (N), oxygen (O), sulfur (S), and phosphorus (P).

The expression "alkenyl" denotes a group derived from a branched or unbranched hydrocarbon having at least one carbon-carbon double bond. Non-limiting examples of the "alkenyl" group may include vinyl, aryl, butenyl, isopropenyl, and isobutenyl, and at least one hydrogen atom of the "alkenyl" may be substituted with the same substituent as in the case of the above-described alkyl group.

The expression "alkynyl" denotes a group derived from a branched or unbranched hydrocarbon having at least one carbon-carbon triple bond. Non-limiting examples of the "alkynyl" may include ethynyl, butynyl, isobutynyl, and isopropynyl.

At least one hydrogen atom of the "alkynyl" may be substituted with the same substituent as in the case of the above-described alkyl group.

The expression "alkoxy" denotes group alkyl-O—, and the alkyl is the same as described above. Non-limiting examples of the "alkoxy" may include methoxy, ethoxy, propoxy, 2-propoxy, butoxy, tert-butoxy, pentyloxy, hexyloxy, cyclopropoxy, and cyclohexyloxy. At least one hydrogen atom of the "alkoxy group" may be substituted with the same substituent as in the case of the above-described alkyl group.

The expression "aryl" also includes a group in which an aromatic ring is fused to at least one carbocyclic ring. Non-limiting examples of the "aryl" may include phenyl, naphthyl, and tetrahydronaphthyl.

Also, at least one hydrogen atom of the "aryl" group may be substituted with the same substituent as in the case of the above-described alkyl group.

The expression "aryloxy" denotes —O-aryl, and examples of the "aryloxy group" may include phenoxy. At least one hydrogen atom of the "aryloxy group" may be substituted with the same substituent as in the case of the above-described alkyl group.

The expression "heteroaryl" group denotes a monocyclic or bicyclic organic compound which includes at least one heteroatom selected from nitrogen (N), oxygen (O), phosphorus (P), or sulphur (S), and the remaining cyclic atoms are carbons. The 'heteroaryl' group, for example, may include about 1 to 5 hetero atoms and about 5 to 10 ring members. The S or N may be oxidized to have various oxidation states.

Examples of the "heteroaryl" may be thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazole-4-yl, isothiazole-5-yl, oxazole-2-yl, oxazole-4-yl, oxazole-5-yl, isoxazole-3-yl, isoxazole-4-yl, isoxazole-5-yl, 1,2,4-triazole-3-yl, 1,2,4-triazole-5-yl, 1,2,3-triazole-4-yl, 1,2,3-triazole-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, or 5-pyrimidin-2-yl.

The expression "heteroaryl" includes a case in which a heteroaromatic ring is fused to at least one aryl, cycloaliphatic, or heterocyclic ring.

The expression "carbon ring" group used in a chemical formula denotes a saturated or partially unsaturated non-aromatic monocyclic, bicyclic, or tricyclic hydrocarbon group.

Examples of the monocyclic hydrocarbon may be cyclopentyl, cyclopentenyl, cyclohexyl, and cyclohexenyl.

Examples of the bicyclic hydrocarbon may be bornyl, decahydronaphthyl, bicyclo[2.1.1]hexyl, bicyclo[2.2.1]heptyl, bicyclo[2.2.1]heptenyl, or bicyclo[2.2.2]octyl. Examples of the tricyclic hydrocarbon may be adamantyl.

The expression "hetero ring", as a cyclic hydrocarbon including at least one heteroatom, may include about 5 to about 20, for example, about 5 to about 10 carbon atoms. Herein, examples of the heteroatom may be one selected from sulfur, nitrogen, oxygen, and boron.

The expressions "alkoxy", "aryloxy", and "heteroaryloxy" respectively denote alkyl, aryl, and heteroaryl which are bonded to an oxygen atom in the present specification.

The expressions "alkylene" group, "alkenylene" group, "alkynylene" group, "arylene" group, and "heteroarylene" group are defined in the same way except that monovalent "alkyl", "alkenyl", "alkynyl", 'aryl', and "heteroaryl" groups are respectively changed to divalent groups.

At least one hydrogen atom of the "alkylene" group, "alkenylene" group, "alkynylene" group, "arylene" group, and "heteroarylene" group may be substituted as in the case of the above-described alkyl group.

The present disclosure will be described in more detail according to the following examples and comparative examples. However, the examples only exemplify the present disclosure, and the scope of the present disclosure is not limited thereto.

PREPARATION EXAMPLE 1

Preparation of LiSTFSI

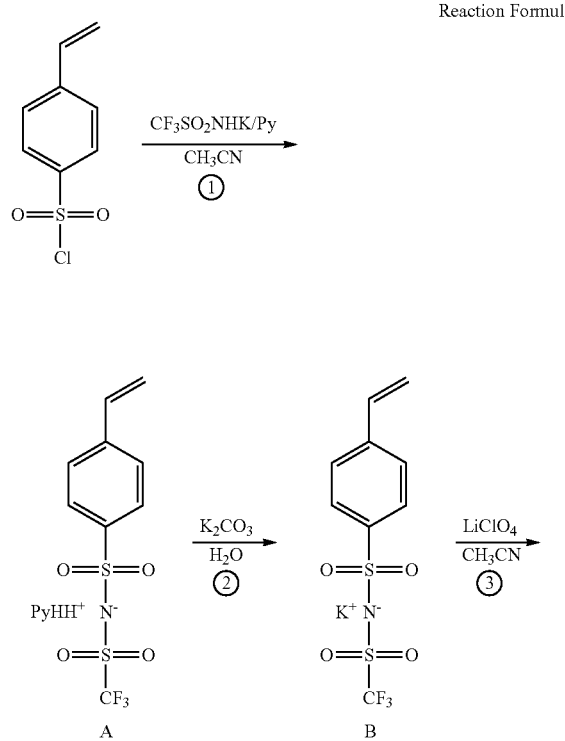

Reaction Formula 1

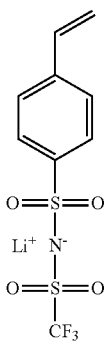

LiSTFSI 4-vinylbenzenesulfonyl chloride (45 millimoles (mmol)), $CF_3SO_2NHK$ (40 mmol), 4-t-butylcatechol (0.1 grams (g)) were reacted in $CH_3CN$ at about 0° C. Subsequently, pyridine (45 mmol) was added to the reaction mixture and the resulting mixture was stirred at about 65° C. for about 48 hours. Once the reaction was complete, compound A may be obtained.

After purifying the compound A thus obtained, $K_2OO_3$ (28 mmol) was added thereto and the mixture was stirred for about 5 hours. Subsequently, a solvent was removed from the resultant product, and a solid thus formed was purified with acetone to obtain 10.5 g of compound B (KSTFSI) (80% yield).

Potassium (K) salt of the of compound B (KSTFSI) was substituted with lithium (Li) ions by adding $CH_3CN$ and $LiClO_4$ to the compound B (KSTFSI) in anhydrous conditions and thus to obtain 8.2 g of LiSTFSI (92% yield).

PREPARATION EXAMPLE 2

Preparation of LiPSTFSI

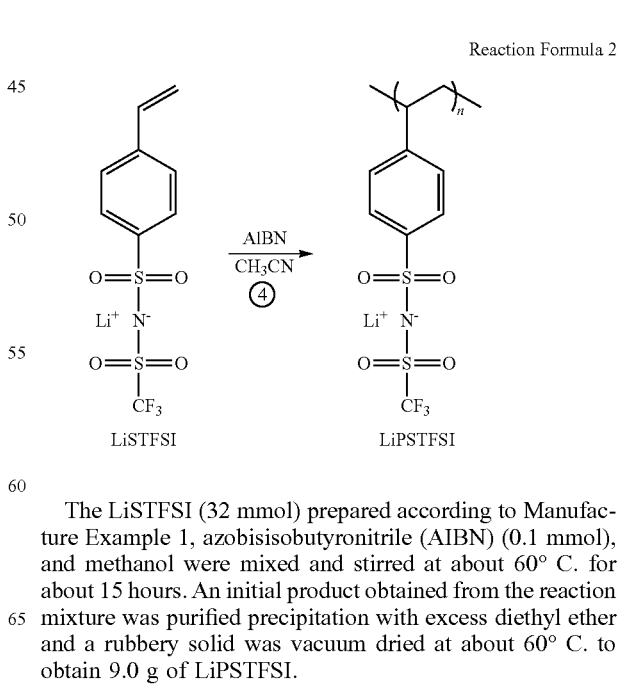

Reaction Formula 2

The LiSTFSI (32 mmol) prepared according to Manufacture Example 1, azobisisobutyronitrile (AIBN) (0.1 mmol), and methanol were mixed and stirred at about 60° C. for about 15 hours. An initial product obtained from the reaction mixture was purified with precipitation with excess diethyl ether and a rubbery solid was vacuum dried at about 60° C. to obtain 9.0 g of LiPSTFSI.

EXAMPLE 1

Preparation of Electrolyte 0.4 mol of the LiSTFI prepared according to Preparation Example 1, 1.0 mol of polyethylene glycol acrylate (PEGA), and 0.4 mol of polydimethylsiloxane (PDMS) were mixed, and AIBN (0.1 mmol) and methanol were mixed therewith to obtain a composition for forming an electrolyte.

The composition for forming an electrolyte thus formed was washed 2 to 3 times with ether, and then filtered and vacuum dried at about 60° C. for about 15 hours to obtain an electrolyte including a polymer represented by Formula 5c below.

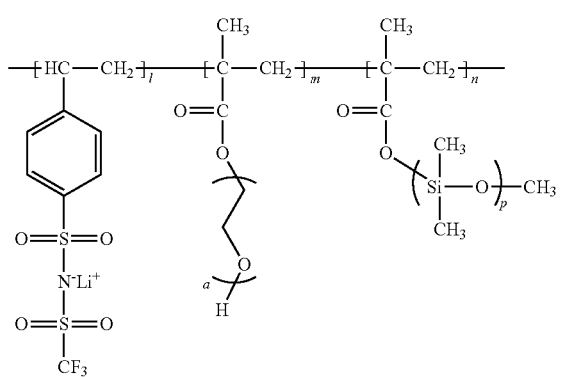

Formula 5c

In Formula 5c, l was 0.2, m was 0.6, n was 0.2, a was 3, and p was 3.

A weight-average molecular weight of the polymer was about 100,000 Daltons or more.

EXAMPLE 2

Preparation of Electrolyte

An electrolyte including a polymer represented by Formula 5c was prepared in the same manner as in Example 1 except that the amount of PDMS was 0.2 mol instead of 0.4 mol. In Formula 5c, l was 0.3, m was 0.6, n was 0.1, a was 3, and p was 3.

EXAMPLE 3

Preparation of Electrolyte

An electrolyte including a polymer represented by Formula 5c was prepared in the same manner as in Example 1 except that the amount of LiSTFSI was 0.9 mol instead of 0.4 mol.

In Formula 5c, l was 0.2, m was 0.4, n was 0.4, a was 3, and p was 3.

COMPARATIVE EXAMPLE 1

Preparation of Electrolyte (PEO/LiTFSI)

20 mol of polyethylene oxide (PEO) and 1 mol of lithium bis(tifluoromethylsulfonyl)imide (LiTFSI) were mixed to prepare an electrolyte.

COMPARATIVE EXAMPLE 2

Preparation of Electrolyte (PEO/LiPSTFSI)

An electrolyte including PEO and LiPSTFSI was obtained in the same manner as in Comparative Example 1 except that the LiPSTFSI obtained according to Manufacture Example 1 was used instead of LiTFSI.

COMPARATIVE EXAMPLE 3

Preparation of Electrolyte (LiPSTFSI/PEGA Polymer)

0.5 mol of the LiPSTFSI obtained according to Manufacture Example 2 and 0.5 mol of PEGA were mixed, and 2,2'-azobisisobutyronitrile (AIBN) (0.1 mmol) and methanol were mixed therewith.

The mixture was coated using a doctor blade, and a polymerization reaction was then performed by heat treating the coated mixture at about 60° C. for about 15 hours to obtain an electrolyte including a LiPSTFSI/PEGA copolymer.

COMPARATIVE EXAMPLE 4

Preparation of Electrolyte (Simple Blend of LiPSTFSI+PEGA+PDMS)

0.4 mol of the LiPSTFSI obtained according to Manufacture Example 2, 1.0 mol of PEGA, and 0.4 mol of PDMS were mixed, and N-methyl pyrrolidone (NMP) as a solvent was mixed therewith to obtain a composition for forming an electrolyte.

The composition for forming an electrolyte was coated using a doctor blade and then dried to obtain an electrolyte including a mixture of LiPSTFSI, PEGA, and PDMS.

Since the electrolyte prepared according to Comparative Example 4 had poor film formability, the electrolyte was difficult to be obtained in the form of a layer.

COMPARATIVE EXAMPLE 5

Preparation of Electrolyte (Blend of LiPSTFSI/PEGA Copolymer and PDMS)

The LiPSTFSI/PEGA copolymer obtained according to Comparative Example 3 and PDMS were blended, and NMP as a solvent was added thereto to prepare a composition for forming an electrolyte.

The composition for forming an electrolyte was coated using a doctor blade and then dried to make an attempt to obtain an electrolyte including a LiPSTFSI/PEGA polymer.

However, according to Comparative Example 5, the electrolyte had poor film formability, the electrolyte was difficult to be obtained in the form of a layer.

MANUFACTURE EXAMPLE 1

Preparation of Lithium Secondary Battery

The composition for forming an electrolyte, which was obtained according to Example 1, was coated on a lithium metal thin film (thickness: about 25 μm) to a thickness of about 10 μm with a doctor blade.

The coated resultant product was dried at about 25° C. and then heat treated at about 120° C. in vacuum to prepare a lithium metal anode on which an electrolyte was formed.

Separately, a cathode composition was obtained by mixing $LiCoO_2$, a conductive agent (Super-P, Timcal Ltd.), polyvinylidene fluoride (PVDF), and N-pyrrolidone. In the cathode composition, a mixing weight ratio of $LiCoO_2$ to the conductive agent and PVDF were about 97:1.5:1.5.

The cathode composition was coated on an aluminum foil (thickness: about 15 μm) and dried at about 25° C. Then, the dried resultant product was dried at about 110° C. in vacuum to prepare a cathode.

A lithium secondary battery was prepared by disposing an electrolyte between the cathode thus obtained and the lithium metal anode. Herein, a liquid electrolyte was added between the cathode and the electrolyte. The liquid electrolyte was obtained by dissolving about 1.3 molar (M) $LiPF_6$ in a mixed solvent having a volume ratio of ethylene carbonate:diethyl carbonate: fluoroethylene carbonate of about 2:6:2.

MANUFACTURE EXAMPLE 2

Preparation of Lithium Secondary Battery

A lithium secondary battery was prepared in the same manner as in Manufacture Example 1 except that the composition for forming an electrolyte, which was obtained according to Example 2, was used instead of the composition for forming an electrolyte which was obtained according to Example 1.

MANUFACTURE EXAMPLE 3

Preparation of Lithium Secondary Battery

A lithium secondary battery was prepared by disposing the electrolyte prepared according to Example 1 between a lithium thin film and a stainless steel electrode.

MANUFACTURE EXAMPLE 4

Preparation of Lithium Secondary Battery

A lithium secondary battery was prepared in the same manner as in Manufacture Example 3 except that the electrolyte prepared according to Example 2 was used instead of the electrolyte prepared according to Example 1.

MANUFACTURE EXAMPLE 5

Preparation of Lithium Secondary Battery

The composition for forming an electrolyte, which was obtained according to Example 1, was coated on a lithium metal thin film (thickness: about 25 μm) to a thickness of about 10 μm with a doctor blade.

The coated resultant product was dried at about 25° C. and then heat treated at about 120° C. in vacuum to prepare a lithium metal anode on which an electrolyte was formed.

Separately, a cathode composition was obtained by mixing $LiCoO_2$, a conductive agent (Super-P, Timcal Ltd.), polyvinylidene fluoride (PVDF), and N-pyrrolidone. In the cathode composition, a mixing weight ratio of $LiCoO_2$ to the conductive agent and PVDF were about 97:1.5:1.5.

The cathode composition was coated on an aluminum foil (thickness: about 15 μm) and dried at about 25° C. Then, the dried resultant product was dried at about 110° C. in vacuum to prepare a cathode.

A lithium secondary battery was prepared by disposing an electrolyte between the cathode thus obtained and the lithium metal anode. Herein, a liquid electrolyte was added between the cathode and the electrolyte. The liquid electrolyte was obtained by adding about 20 wt % of PYR13TFSI (N-methyl-N-propylpyrrolidinium bis(trifluoromethanesulfonyl)imide) to a mixed solvent having a volume ratio of ethylene carbonate:diethyl carbonate: fluoroethylene carbonate of about 2:6:2. A polypropylene separator (Cellgard 3501), as a separator having a porosity of about 48%, was disposed between the cathode and the electrolyte.

MANUFACTURE EXAMPLE 6

Preparation of Lithium Secondary Battery

A lithium secondary battery was prepared in the same manner as in Manufacture Example 5 except that the composition for forming an electrolyte, which was obtained according to Example 2, was used instead of the composition for forming an electrolyte which was obtained according to Example 1.

MANUFACTURE EXAMPLE 7

Preparation of Lithium Secondary Battery (Pouch Cell)

A cathode composition was obtained by mixing $LiCoO_2$, a conductive agent (Super-P, Timcal Ltd.), polyvinylidene fluoride (PVDF), and N-pyrrolidone. In the cathode composition, a mixing weight ratio of $LiCoO_2$ to the conductive agent and PVDF were about 97:1.5:1.5. The cathode composition was coated on an aluminum foil (thickness: about 15 μm) and dried at about 25° C. Then, the dried resultant product was dried at about 110° C. in vacuum to prepare a cathode.

Separately, the composition for forming an electrolyte, which was obtained according to Example 1, was coated on a lithium metal thin film (thickness: about 25 μm) to a thickness of about 10 μm with a doctor blade.

The coated resultant product was dried at about 25° C. and then heat treated at about 120° C. in vacuum to prepare a lithium metal anode on which an electrolyte was formed.

An electrode assembly was prepared by disposing a polyethylene separator between the cathode thus obtained and the anode. A solution, in which about 1.3 M $LiPF_6$ was dissolved in a mixed solvent having a mixing volume ratio of ethylene carbonate (EC) to diethyl carbonate (DEC) of about 3:7, was used as an electrolyte.

The above-described electrode assembly was surrounded by a pouch (D-EL35H, DNP), charged with the electrolyte, and then vacuum sealed to prepare a laminate battery.

MANUFACTURE EXAMPLE 8

Preparation of Lithium Secondary Battery (Pouch Cell)

A lithium secondary battery was prepared in the same manner as in Manufacture Example 7 except that the composition for forming an electrolyte, which was prepared according to Example 2, was used instead of the composition for forming an electrolyte which was prepared according to Example 1.

COMPARATIVE MANUFACTURE EXAMPLES 1 and 2

Preparation of Lithium Secondary Batteries (Full Cells)

Lithium secondary batteries were prepared in the same manner as in Manufacture Example 1 except that the electrolyte compositions obtained according to Comparative Examples 1 and 2 were respectively used instead of the electrolyte composition obtained according to Example 1.

COMPARATIVE MANUFACTURE EXAMPLE 3

Preparation of Lithium Secondary Battery (Full Cell)

A cathode composition was obtained by mixing $LiCoO_2$, a conductive agent (Super-P, Timcal Ltd.), polyvinylidene fluoride (PVDF), and N-pyrrolidone. In the cathode composition, a mixing weight ratio of $LiCoO_2$ to the conductive agent and PVDF were about 97:1.5:1.5.

The cathode composition was coated on an aluminum foil (thickness: about 15 μm) and dried at about 25° C. Then, the dried resultant product was dried at about 110° C. in vacuum to prepare a cathode.

A lithium secondary battery (full cell) was prepared by using a polypropylene separator (Cellgard 3510) as a separator between the cathode thus obtained and a lithium metal thin film (thickness: about 20 μm) and using a solution, in which about 1.3 M $LiPF_6$ was dissolved in ethylene carbonate (EC)+diethyl carbonate (DEC)+fluoroethylene carbonate (FEC) (volume ratio of about 2:6:2), as an electrolyte.

COMPARATIVE MANUFACTURE EXAMPLE 4

Preparation of Lithium Secondary Battery (Pouch Cell)

A laminate lithium secondary battery was prepared in the same manner as in Manufacture Example 7 except that a lithium metal anode was used as an anode.

EVALUATION EXAMPLE 1

$^1$H-nuclear magnetic resonance (NMR)

Analysis was performed on a $^1$H-NMR spectrum of the polymer represented by Formula 5c which was obtained according to Example 1. A sample for analysis was prepared by dissolving about 10 milligrams (mg) of the polymer in about 0.75 milliliters (ml) of acetone-dimethyl sulfoxide (DMSO). The $^1$H-NMR analysis was performed using a 600 megaHertz (MHz) Bruker NMR (ADVANCE III) spectrometer.

Figure 4A:
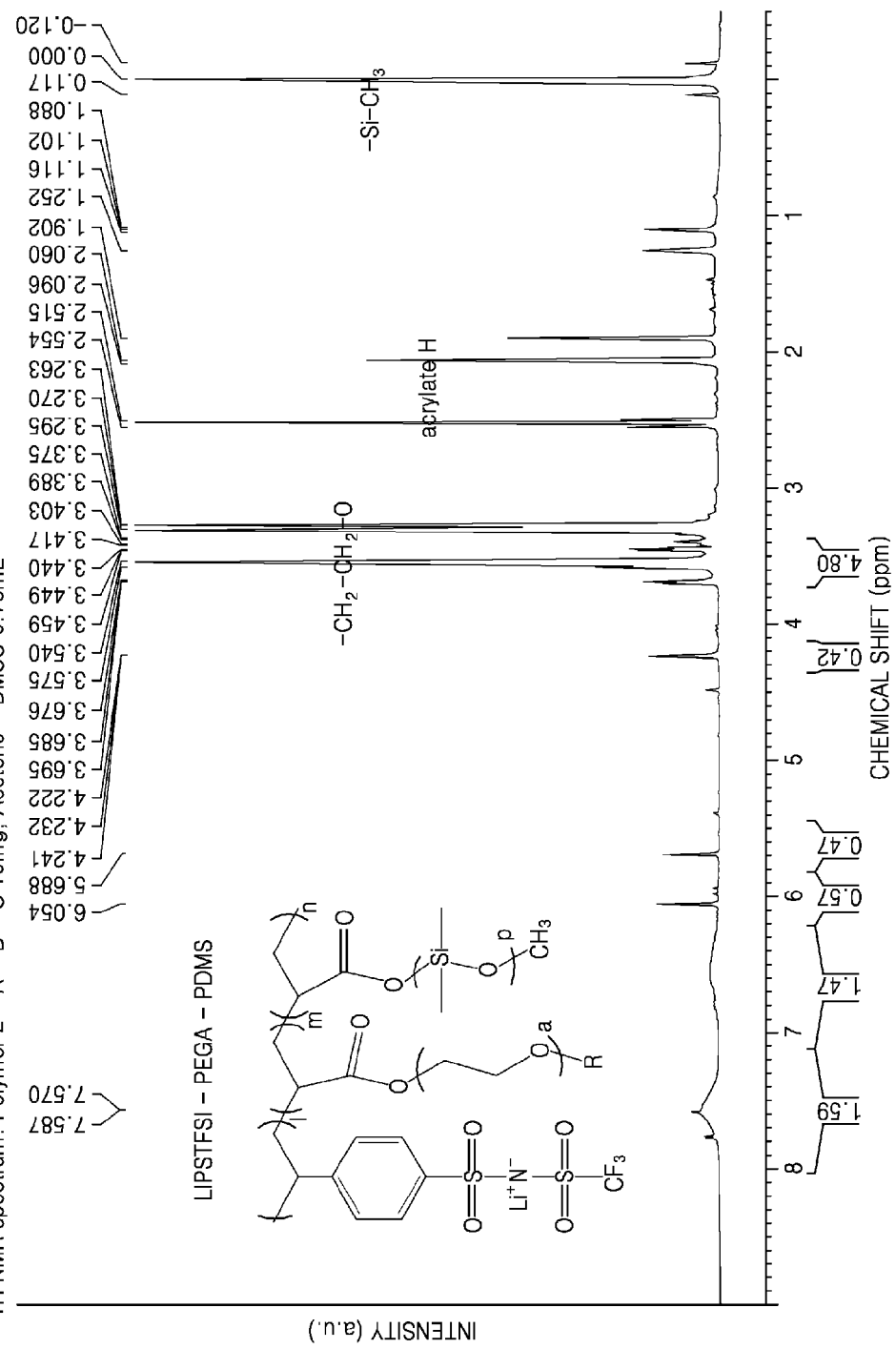
FIG. 4A is a graph of intensity (arbitrary units, a. u.) versus chemical shift (parts per million, ppm), which illustrates results of $^1$H-nuclear magnetic resonance (NMR) spectrum analysis of a polymer obtained according to Example 1.

The results of the $^1$H-NMR analysis are presented in FIG. 4A.

Referring to FIG. 4A, a structure of the polymer obtained according to Example 1 may be confirmed.

EVALUATION EXAMPLE 2

$^7$Li-NMR

Analysis was performed on a $^7$Li-NMR spectrum of the polymer represented by Formula 5c which was obtained according to Example 1. The $^7$Li-NMR analysis was performed using a 600 MHz Bruker NMR (ADVANCE III) spectrometer as an analysis instrument.

Figure 4B:
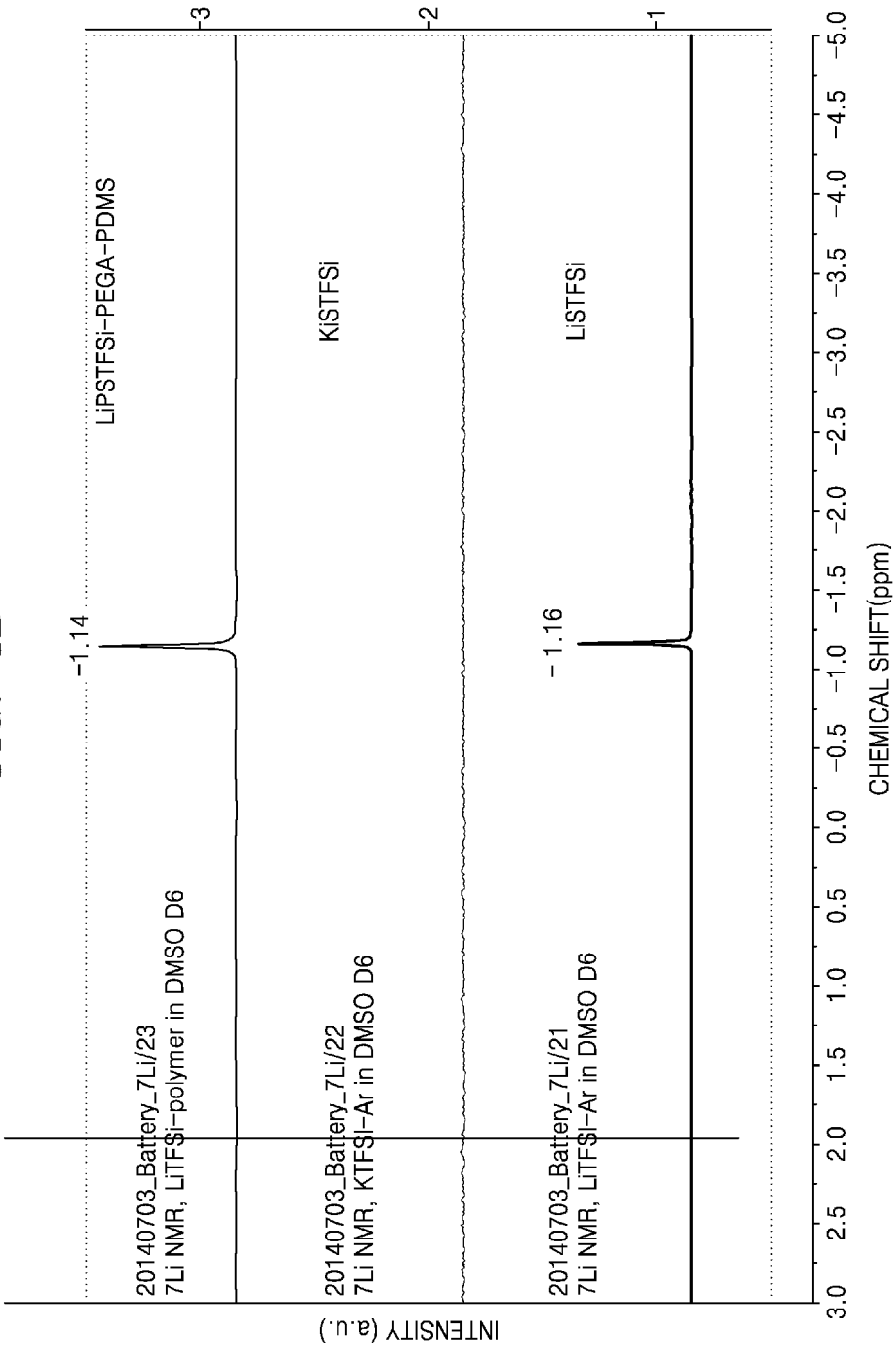

The results of the $^7$Li-NMR analysis are presented in FIG. 4B.

In FIG. 4B, nuclear magnetic resonance spectrums of the KSTFSI and LiSTFSI obtained according to Manufacture Example 1 are illustrated together for comparison with the polymer obtained according to Example 1.

Referring to FIG. 4B, the polymer obtained according to Example 1 exhibited a different lithium peak pattern from the KSTFSI and a similar pattern in comparison to the LiSTFSI. Thus, it may be confirmed that since the reaction proceeded, the polymer obtained according to Example 1 had a structure of a single ion conductor.

EVALUATION EXAMPLE 3

Differential Scanning calorimetry (DSC) Analysis

DSC analysis was performed on the polymer that was prepared according to Example 1. Universal V4.5A TA Q2000 (TA Instruments) was used as an analysis instrument during the DSC analysis.

Figure 4C:
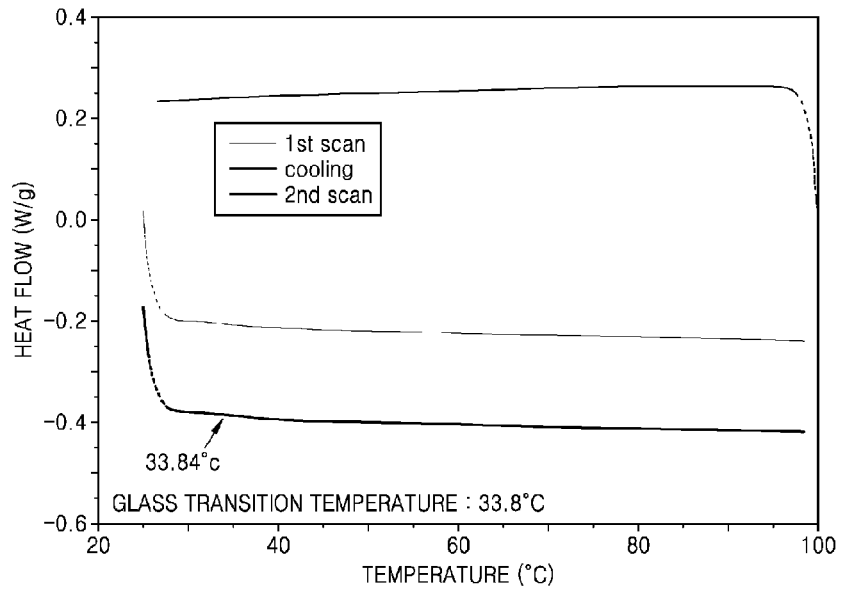
FIG. 4C is a graph of heat flow (watts per gram, W/g) versus temperature (degree Centigrade, ° C.), which illustrates results of differential scanning calorimetry analysis of the polymer prepared according to Example 1.

The results of the DSC analysis are presented in FIG. 4C.

As a result, the polymer prepared according to Example 1 had a glass transition temperature of about 33.8° C., and thus, it may be understood that the polymer may be maintained in a rubbery state at room temperature.

EVALUATION EXAMPLE 4

Gel Permeation Chromatography (GPC)

GPC analysis was performed on the polymer represented by Formula 5c which was prepared according to Example 1. The results of the GPC analysis are presented in FIG. 4D.

Figure 4D:
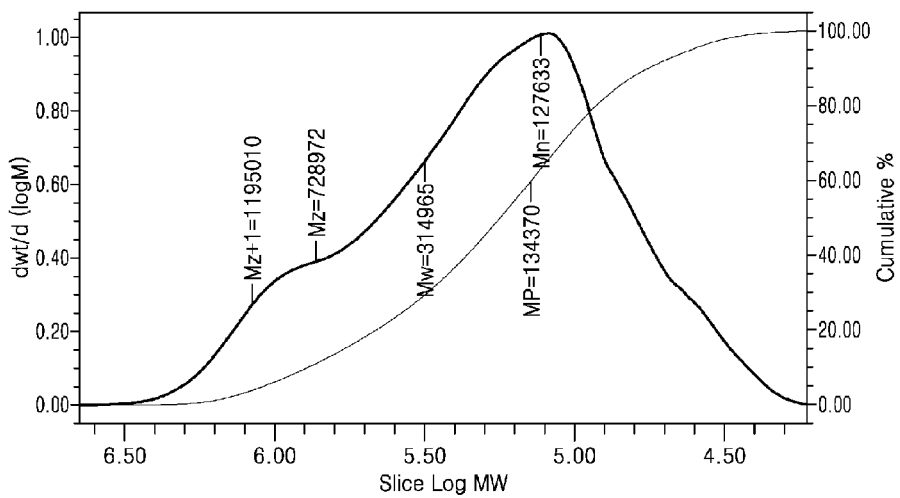
FIG. 4D is a graph of molecular weight distribution dwt/d (log M) and cumulative percent (%) versus slice logarithm molecular weight (log MW), which illustrates results of gel permeation chromatography (GPC) analysis of the polymer prepared according to Example 1.

Referring to FIG. 4D, a molecular weight of the polymer represented by Formula 5c was about 100,000 Daltons or more, and the polymer exhibited two or more molecular weight distributions.

EVALUATION EXAMPLE 5

Ionic Conductivity Measurement

Ionic conductivities of the electrolytes prepared according to Examples 1 to 3 and Comparative Examples 1 and 2 were measured according to the following method. The ionic conductivities were measured by an alternating current impedance method.

The ionic conductivities of the electrolytes prepared according to Examples 1 to 3 and Comparative Examples 1 and 2 were evaluated by applying a voltage bias of about 10 milliVolts (mV) in a frequency range of about 1 Hertz (Hz) to about 1 megaHertz (MHz) and measuring resistance while scanning the temperature, and the results thereof are presented in Table 1 below.

TABLE 1

| Category | Composition (mole fraction of each repeating unit) | Ionic conductivity (S/cm) |
|---|---|---|
| Example 1 | LiPSTFSI-PEGA-PDMS (0.2:0.6:0.2) | $3.3 \times 10^{-6}$ |

TABLE 1-continued

| Category | Composition (mole fraction of each repeating unit) | Ionic conductivity (S/cm) |
|---|---|---|
| Example 2 | LiPSTFSI-PEGA-PDMS (0.3:0.6:0.1) | $2.6 \times 10^{-6}$ |
| Example 3 | LiPSTFSI-PEGA-PDMS (0.2:0.4:0.4) | $8.5 \times 10^{-7}$ |
| Comparative Example 1 | PEO/LiTFSI | $1.5 \times 10^{-7}$ |
| Comparative Example 2 | PEO/LiPSTFSI | $5.0 \times 10^{-7}$ |

Referring to Table 1, it may be understood that the electrolytes prepared according to Examples 1 to 3 had improved conductivities in comparison to the electrolytes prepared according to Comparative Examples 1 and 2.

EVALUATION EXAMPLE 6

Current Density and Impedance

Resistances of the lithium secondary batteries (full cells) prepared according to Manufacture Examples 1 and 2 were measured at 25° C. according to a 2-probe method by using an impedance analyzer (Solartron 1260A Impedance/Gain-Phase Analyzer). An amplitude was about ±10 mV and a frequency was in a range of about 0.1 Hz to about 1 MHz.

Figure 5A:
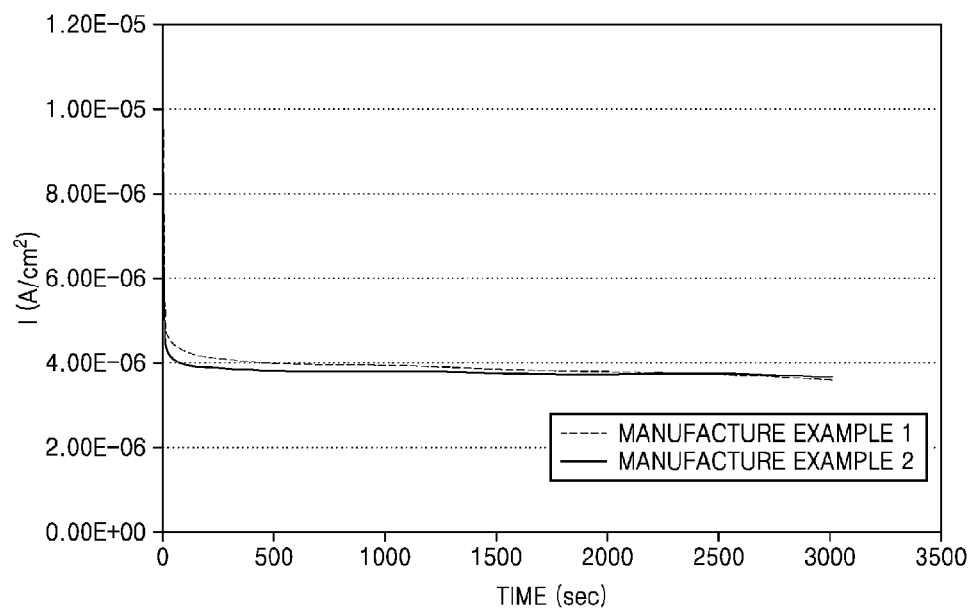
FIGS. 5A and 5B are respectively graphs of current density (Amperes per square centimeter, A/cm$^2$) versus time (seconds, sec) and impedance Z' versus impedance Z", which illustrate current density and impedance characteristics of lithium secondary batteries (full cells) prepared according to Manufacture Examples 1 and 2.
Figure 5B:
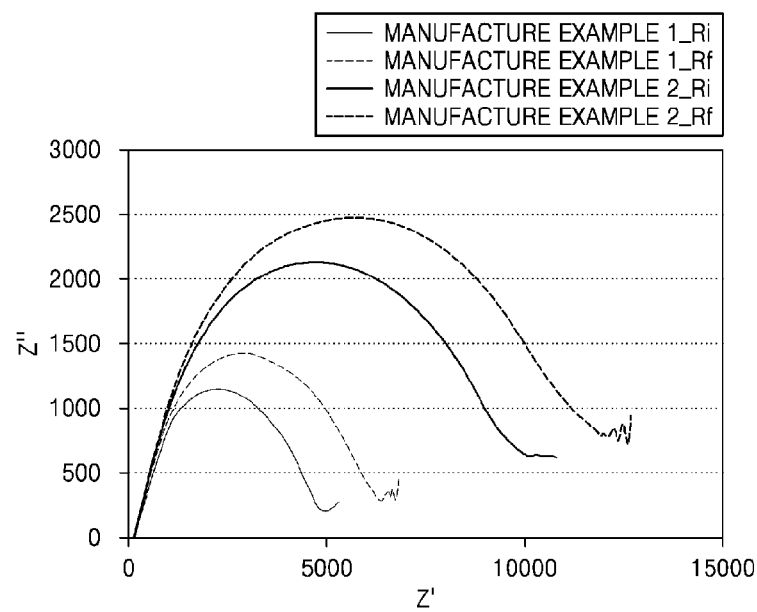

When the time elapsed after the preparation of the above-described lithium secondary batteries was about 24 hours, changes in current density and impedance measurement results are respectively presented in FIGS. 5A and 5B.

Referring to FIG. 5A, it may be confirmed that, with respect to the lithium secondary batteries prepared according to Manufacture Examples 1 and 2, current densities versus time were stably maintained. In FIG. 5B, Ri represents an initial resistance and Rf represents a final resistance.

As illustrated in FIG. 5B, it may be understood that the lithium secondary batteries prepared according to Manufacture Examples 1 and 2 had excellent interfacial resistance characteristics.

EVALUATION EXAMPLE 7

Lithium Ion Mobility

Lithium ion mobilities ($t_{Li}$) of the electrolytes prepared according to Examples 1 and 2 and the electrolyte prepared according to Comparative Example 1 were measured at 25° C. and some of the results are presented in Table 2 below.

The lithium ion mobility may be calculated by the following Equation 1, and the results thereof are presented in Table 2 below. Values necessary for the calculation of the lithium ion mobility were used by measuring current decay versus time with respect to impedance and input voltage of a lithium symmetric cell or stainless steel (SUS) symmetric cell (Electrochimica Acta 93 (2013) 254).

$$t_{Li^+} = \frac{i_{ss}(\Delta V - i_0 R^0)}{i_0(\Delta V - i_{ss} R^{ss})} \qquad \text{Equation 1}$$

In Equation 1,
ΔV is voltage change (Volts, V),
$\Delta i_0$ is an initial current (microAmperes, μA),
$i_{ss}$ is a steady-state current (microAmperes, μA),
$R^0$ is an initial resistance (kiloOhms, kΩ), and
$R^{ss}$ is a steady-state resistance (kiloOhms, kΩ).

TABLE 2

| | ΔV (V) | $R^0$ (kΩ) | $R^{ss}$ (kΩ) | $i_0$ (μA) | $i_{ss}$ (μA) | $t_{Li+}$ |
|---|---|---|---|---|---|---|
| Example 1 | 0.01 | 5.1 | 6.9 | 0.63 | 82 | 46 |
| Example 2 | 0.01 | 9.8 | 12 | 10 | 3.9 | 0.94 |
| Comparative Example 1 | 0.01 | 0.59 | 0.63 | 82 | 46 | 0.18 |

Referring to Table 2, it may be understood that the electrolytes of Examples 1 and 2 had improved lithium ion mobilities in comparison to the case of Comparative Examples 1.

EVALUATION EXAMPLE 8

Electrochemical Stability

Electrochemical stability was evaluated by performing linear sweep voltammogram (LSV) analysis on the lithium secondary batteries prepared according to Manufacture Examples 3 and 4.

Figure 5C:
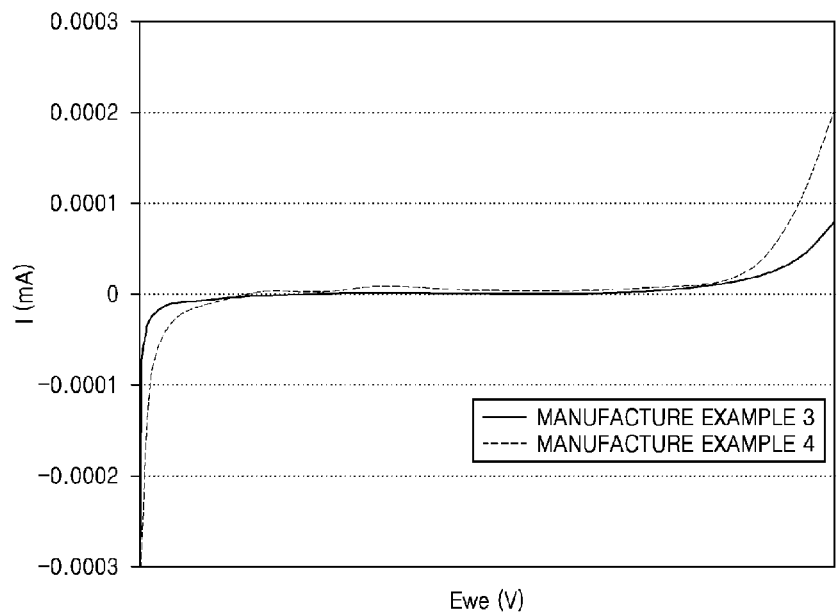
FIG. 5C is a graph of current (milliAmperes, mA) versus potential E (Volts, V), which illustrates results of linear sweep voltammogram (LSV) analysis of lithium secondary batteries prepared according to Manufacture Examples 3 and 4.

Electrochemical stability was examined by performing the LSV analysis on the lithium secondary batteries, and the results of the LSV analysis are presented in FIG. 5C.

LSV measurement conditions are as follows:
Voltage range: about 3 Volts (V) to about 7 V, Scan rate: about 0.1 milliVolts per second (mV/s)
Temperature: about 25° C.

Referring to FIG. 5C, it may be understood that the lithium secondary batteries prepared according to Manufacture Examples 3 and 4 had excellent electrochemical stabilities up to about 4.3 V.

EVALUATION EXAMPLE 9

Charge and Discharge Characteristic Measurement

1) Manufacture Examples 5 and 6 and Comparative Manufacture Example 3

The lithium secondary batteries prepared according to Manufacture Examples 5 and 6 and the lithium secondary battery prepared according to Comparative Manufacture Example 3 were charged at a 0.1 Coulombs (C) constant current rate in a voltage range of about 3.0 V to about 4.4 V versus lithium metal at room temperature (about 25° C.), and then discharged at a constant current of about 0.72 milli-Amperes (mA) (0.2 C rate) until the voltage reached a cut-off voltage of about 4.4 V.

The above-described charge and discharge cycle was repeated about 100 times.

Figure 6:
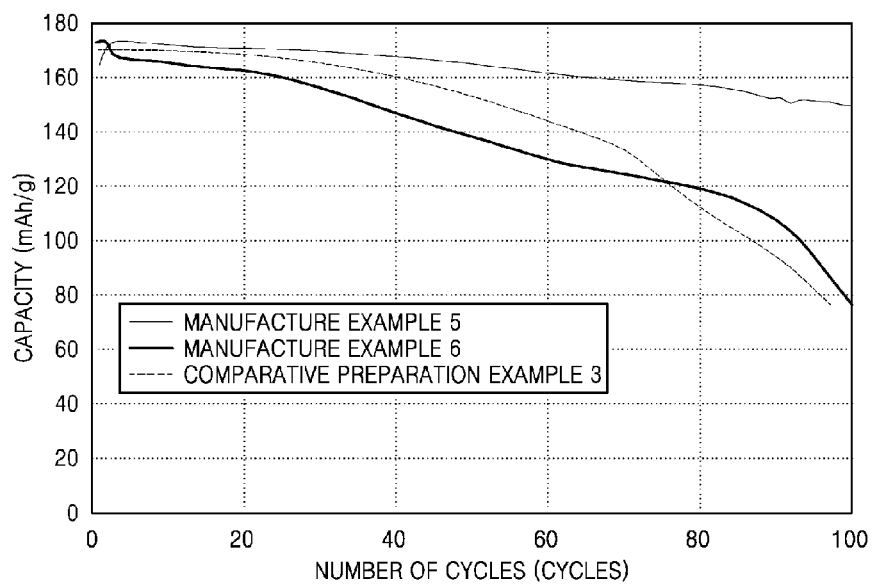
FIG. 6 is a graph of capacity (milliAmpere hours per gram, mAh/g) versus number of cycles, which illustrates changes in capacity versus the number of cycles of lithium secondary batteries prepared according to Manufacture Examples 5 and 6 and a lithium secondary battery prepared according to Comparative Manufacture Example 3.

Changes in capacity versus the number of cycles are illustrated in FIG. 6. A capacity retention rate was calculated by the following Equation 2.

Capacity retention rate (%)=(capacity in a $100^{th}$ cycle/capacity in a $1^{st}$ cycle)×100  Equation 2

Referring to FIG. 6, it may be understood that the lithium secondary batteries prepared according to Manufacture Examples 5 and 6 had improved charge and discharge characteristics in comparison to the lithium secondary battery prepared according to Comparative Manufacture Example 3.

A capacity retention rate of the lithium secondary battery prepared according to Manufacture Examples 5 was about 86%. In contrast, a capacity retention rate of the lithium secondary battery prepared according to Comparative Manufacture Example 3 was about 45%.

2) Manufacture Example 7 and Comparative Manufacture Example 4

The lithium secondary battery prepared according to Manufacture Example 7 and the lithium secondary battery prepared according to Comparative Manufacture Example 4 were charged at a 0.1 C constant current rate in a voltage range of about 3.0 V to about 4.4 V versus lithium metal at room temperature (about 25° C.), and then discharged at a constant current of about 0.72 mA (0.2 C or 0.5 C rate) until the voltage reached a cut-off voltage of about 4.4 V.

The above-described charge and discharge cycle was repeated about 100 times.

Figure 7:
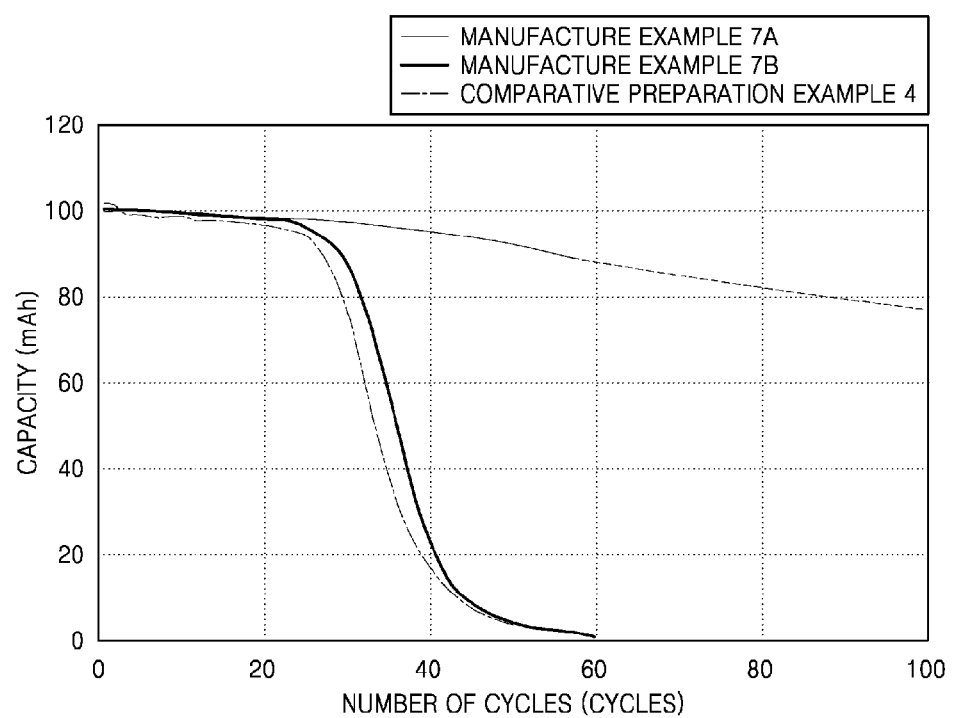
FIG. 7 is a graph of capacity (milliAmpere hours per gram, mAh/g) versus number of cycles, which illustrates changes in capacity versus the number of cycles of a lithium secondary battery prepared according to Manufacture Example 7 and a lithium secondary battery prepared according to Comparative Manufacture Example 4.

Changes in capacity versus the number of cycles are illustrated in FIG. 7. In FIG. 7, Manufacture Example 7A represents a case of discharging at 0.2 C and Manufacture Example 7B represents a case of discharging at 0.5 C.

Referring to FIG. 7, it may be understood that the lithium secondary battery prepared according to Manufacture Example 7 had improved charge and discharge characteristics in comparison to the lithium secondary battery prepared according to Comparative Manufacture Example 4.

Also, when the lithium secondary battery prepared according to Manufacture Example 7 was discharged at 0.2 C, the capacity retention rate after the $100^{th}$ cycle was about 92%. In contrast, with respect to the lithium secondary battery prepared according to Comparative Manufacture Example 4, the capacity retention rate after the $100^{th}$ cycle was about 75%.

As described above, according to the one or more of the above exemplary embodiments, an electrolyte according to an embodiment of the present disclosure has improved ionic conductivity and lithium ion mobility as well as excellent electrochemical stability and mechanical strength. A lithium secondary battery having an improved capacity retention rate may be prepared when the electrolyte is used.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A polymer comprising:
a first repeating unit represented by Formula 1;
a second repeating unit represented by Formula 2; and
a third repeating unit represented by Formula 3:

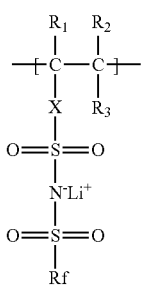

Formula 1 wherein in Formula 1,
$R_1$ to $R_3$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group,
X represents a substituted or unsubstituted $C_1$-$C_{20}$ alkylene group, a substituted or unsubstituted $C_1$-$C_{20}$ heteroalkylene group a substituted or unsubstituted $C_6$-$C_{20}$ arylene group, a substituted or unsubstituted $C_2$-$C_{20}$ heteroarylene group, a substituted or unsubstituted $C_2$-$C_{20}$ heterocyclic group, a substituted or unsubstituted $C_4$-$C_{20}$ carbocyclic group, or —C(=O)O(CH$_2$)$_n$— (where n is an integer between 1 and 10), and
Rf represents fluorine, a $C_1$-$C_{20}$ perfluorinated alkyl group, a $C_3$-$C_{20}$ perfluorinated carbocyclic group, a $C_6$-$C_{20}$ perfluorinated aryl group, or a $C_2$-$C_{20}$ perfluorinated heteroaryl group,

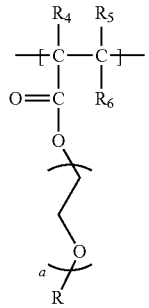

Formula 2 wherein in Formula 2,
$R_4$ to $R_6$ each independently represent hydrogen, an unsubstituted or substituted $C_1$-$C_{20}$ alkyl group, an unsubstituted or substituted $C_1$-$C_{20}$ heteroalkyl group, or an unsubstituted or substituted $C_6$-$C_{20}$ aryl group,
R represents hydrogen, a $C_1$-$C_{20}$ alkyl group, a $C_1$-$C_{20}$ heteroalkyl group a $C_6$-$C_{20}$ aryl group, a $C_2$-$C_{20}$ heteroaryl group, a $C_2$-$C_{20}$ heterocyclic group, a $C_4$-$C_{20}$ carbocyclic group, —PO$_3$Li, or —SO$_2$Li, and
a is an integer between 1 and 20,

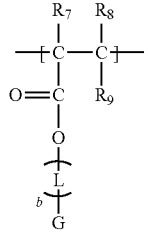

Formula 3 wherein in Formula 3,
$R_7$ to $R_9$ each independently represent hydrogen, an unsubstituted or substituted $C_1$-$C_{20}$ alkyl group, an unsubstituted or substituted $C_1$-$C_{20}$ heteroalkyl group or an unsubstituted or substituted $C_6$-$C_{20}$ aryl group,
L represents a substituted or unsubstituted $C_1$-$C_{20}$ alkylene group, a substituted or unsubstituted $C_1$-$C_{20}$ heteroalkylene group a substituted or unsubstituted $C_6$-$C_{20}$ arylene group, a substituted or unsubstituted $C_2$-$C_{20}$ heteroarylene group, a substituted or unsubstituted $C_2$-$C_{20}$ heterocyclic group, or a substituted or unsubstituted $C_4$-$C_{20}$ carbocyclic group, b is 0 or an integer between 1 and 5, and G is a group represented by Formula 3a, or a group represented by Formula 3f,

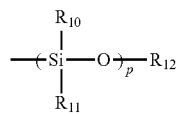
Formula 3a wherein in Formula 3a, $R_{10}$ to $R_{12}$ each independently represent hydrogen, a $C_1$-$C_{20}$ alkyl group, a $C_1$-$C_{20}$ heteroalkyl group, a $C_6$-$C_{20}$ aryl group, a $C_2$-$C_{20}$ carbocyclic group, or a $C_2$-$C_{20}$ heterocyclic group, and

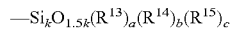
Formula 3f wherein in Formula 3f, $R^{13}$, $R^{14}$, and $R^{15}$ each independently represent hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heterocyclic group, a substituted or unsubstituted $C_4$-$C_{20}$ carbocyclic group, or a $C_1$-$C_{20}$ silicon-containing functional group, and k=a+b+c and 6≤k≤20, wherein the polymer has a glass transition temperature of about 25° C. or less or a Young's modulus of about 10 megaPascals or greater.

2. The polymer of claim 1, wherein X in Formula 1 is phenylene or —C(═O)O(CH$_2$)$_n$—, (wherein n is an integer between 1 and 5).

3. The polymer of claim 1, wherein Rf is —F, —CF$_3$, or —CF$_2$CF$_3$.

4. The polymer of claim 1, wherein an amount of the third repeating unit represented by Formula 3 is in a range of about 0.1 moles to about 0.8 moles based on 1 mole of the second repeating unit.

5. The polymer of claim 1, wherein an amount of the first repeating unit represented by Formula 1 is in a range of about 0.2 moles to about 0.9 moles based on 1 mole of the second repeating unit.

6. The polymer of claim 1, wherein the polymer is a polymer represented by Formula 4:

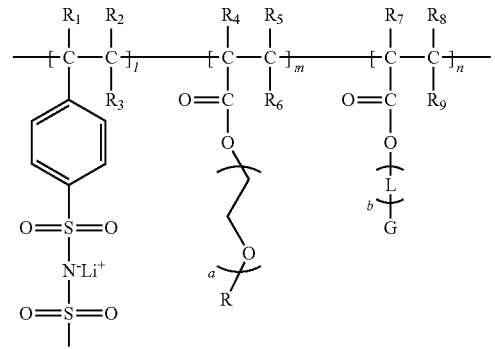
Formula 4 wherein in Formula 4, l+m+n=1, 0.1≤l≤0.3, 0.4≤m≤0.6, and 0.2≤n≤0.4, $R_1$ to $R_9$ each independently represent hydrogen, a $C_6$-$C_{20}$ alkyl group, or a $C_6$-$C_{20}$ aryl group, Rf represents fluorine, a $C_1$-$C_{12}$ perfluorinated alkyl group, or a $C_3$-$C_{12}$ perfluorinated carbocyclic group, a is an integer between 1 and 20, R represents a $C_1$-$C_{20}$ alkyl group, a $C_6$-$C_{20}$ aryl group, —PO$_3$Li, or —SO$_2$Li, L represents an unsubstituted or substituted $C_1$-$C_{20}$ alkylene group, or an unsubstituted or substituted $C_6$-$C_{20}$ arylene group, b is 0 or an integer between 1 and 5, and G is a group represented by Formula 3a, or a group represented by Formula 3f,

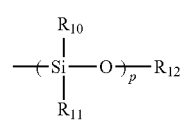
Formula 3a wherein in Formula 3a, $R_{10}$ to $R_{12}$ each independently represent hydrogen, a $C_1$-$C_{20}$ alkyl group, or a $C_6$-$C_{20}$ aryl group, and

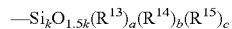
Formula 3f wherein in Formula 3f, $R^{13}$, $R^{14}$, and $R^{15}$ each independently represent hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group, and k=a+b+c and 6≤k≤20.

7. The polymer of claim 1, wherein G in Formula 3 is one selected from groups represented by Formulae 3b to 3d:

Formula 3b

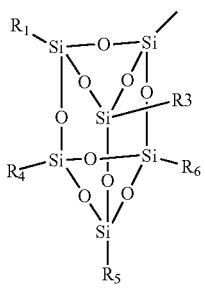

wherein in Formula 3b, $R_1$, $R_3$ to $R_6$ each independently represent hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group, Formula 3c

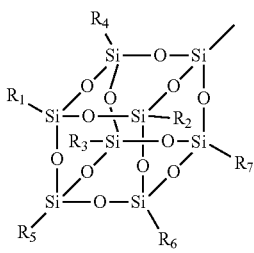

wherein in Formula 3c, $R_1$, $R_2$, $R_4$ to $R_8$ each independently represent hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group, and Formula 3d

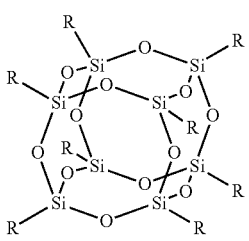

wherein in Formula 3d, R is each independently represents hydrogen, a substituted or unsubstituted $C_1$-$C_{20}$ alkyl group, a substituted or unsubstituted $C_1$-$C_{20}$ alkoxy group, a substituted or unsubstituted $C_6$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group.

8. The polymer of claim 1, wherein the polymer is one selected from polymers represented by Formulae 5, 5a, and 6 to 8:

Formula 5

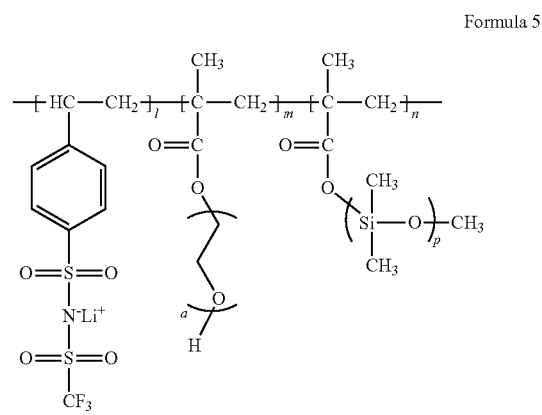

wherein in Formula 5, a is an integer between 1 and 20, p is a number between 1 and 5,
$0.1 \leq l \leq 0.3$,
$0.4 \leq m \leq 0.6$, and
$0.2 \leq n \leq 0.4$,
provided that $l+m+n=1$, Formula 5a

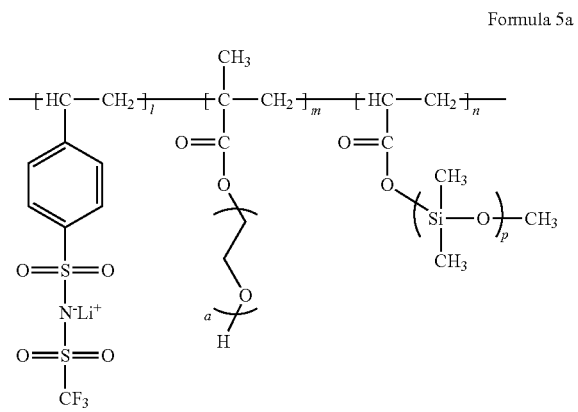

wherein in Formula 5a,
a is an integer between 1 and 20,
p is a number between 1 and 5, 0.1≤l≤0.3,
0.4≤m≤0.6, and
0.2≤n≤0.4,
provided that l+m+n=1, Formula 6

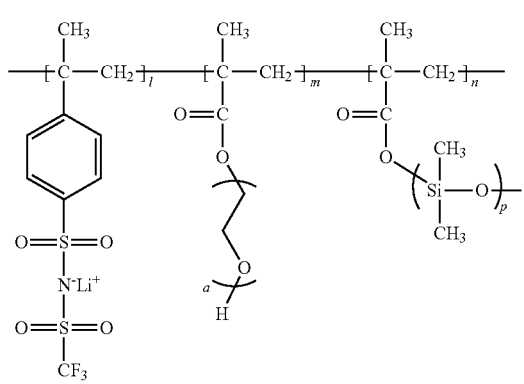

wherein in Formula 6,
a is an integer between 1 and 20,
p is a number between 1 and 5,
0.1≤l≤0.3,
0.4≤m≤0.6, and
0.2≤n≤0.4,
provided that l+m+n=1, Formula 7

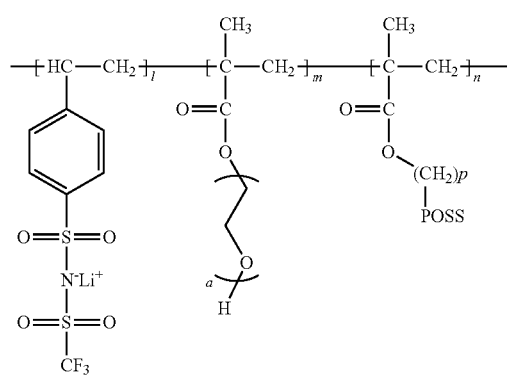

Formula 8

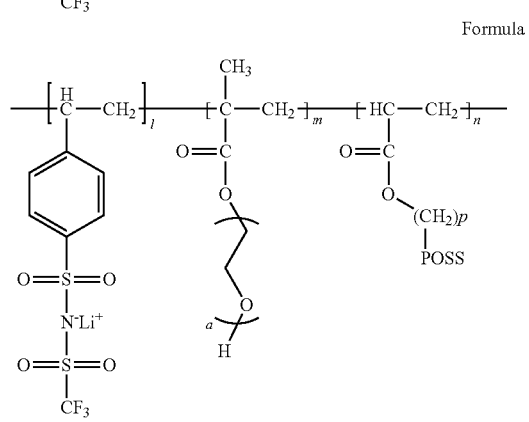

wherein in Formulae 7 and 8,
a and p are integers between 1 and 5,
0.1≤l≤0.3,
0.4≤m, ≤0.6, and
0.2≤n≤0.4,
provided that l+m+n=1, and
POSS is one selected from groups represented by Formulae 3b to 3d, Formula 3b

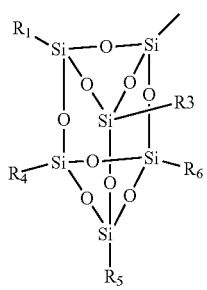

wherein in Formula 3b, $R_1$, $R_3$ to $R_6$ represent a methyl group, an ethyl group, a propyl group, an isopropyl group, a butyl group, or an isobutyl group, Formula 3c

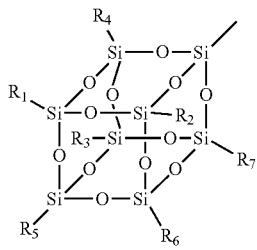

wherein in Formula 3c, $R_1$, $R_2$, $R_4$ to $R_8$ represent a methyl group, an ethyl group, a propyl group, an isopropyl group, a butyl group, or an isobutyl group, and Formula 3d

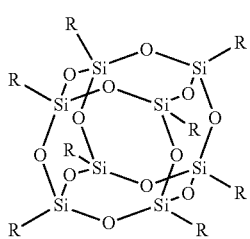

wherein in Formula 3d, R represents a methyl group, an ethyl group, a propyl group, an isopropyl group, a butyl group, or an isobutyl group.

9. The polymer of claim 1, wherein a lithium ion mobility of the polymer is in a range of about 0.91 to about 0.94.

10. The polymer of claim 1, wherein the polymer is a polymer represented by Formula 5c:

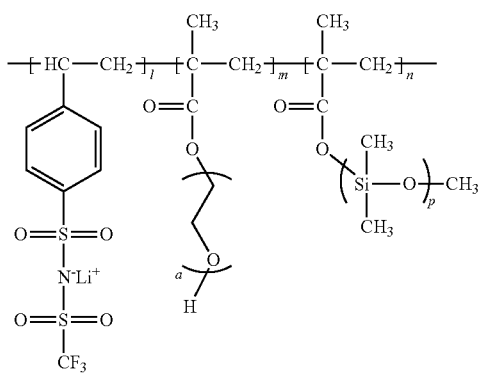

Formula 5c wherein in Formula 5c,
l is 0.2, m is 0.5, n is 0.3, a is 1, and p is 1, or
l is 0.2, m is 0.6, n is 0.2, a is 3, and p is 3, or
l is 0.3, m is 0.6, n is 0.1, a is 3, and p is 3, or
l is 0.2, m is 0.4, n is 0.4, a is 3, and p is 3,
provided that l+m+n=1.

11. An electrolyte comprising the polymer of claim 1.

12. The electrolyte of claim 11, further comprising at least one inorganic particle selected from $SiO_2$, $TiO_2$, $ZrO_2$, $HfO_2$, ZnO, $Al_2O_3$, $BaTiO_3$, and a metal-organic framework.

13. The electrolyte of claim 11, further comprising at least one ionic liquid which is selected from compounds comprising:
(i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof; and
(ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $PF_6^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

14. A lithium secondary battery comprising:
a cathode;
an anode; and
the electrolyte of claim 11 disposed between the cathode and the anode.

15. The lithium secondary battery of claim 14, further comprising at least one selected from a liquid electrolyte, a solid electrolyte, a gel electrolyte, a polymer ionic liquid, and a separator.

16. The lithium secondary battery of claim 15, wherein the liquid electrolyte comprises at least one selected from an ionic liquid, an organic solvent, and a lithium salt.

17. The lithium secondary battery of claim 14, wherein the anode is a lithium metal electrode or a lithium metal alloy electrode.

18. The lithium secondary battery of claim 14, wherein
the anode is a lithium metal electrode or a lithium metal alloy electrode, and
at least one selected from a liquid electrolyte, a gel electrolyte, a solid electrolyte, a separator, and a polymer ionic liquid is further disposed between the anode and the cathode.

19. The lithium secondary battery of claim 14, wherein the polymer is represented by Formula 4:

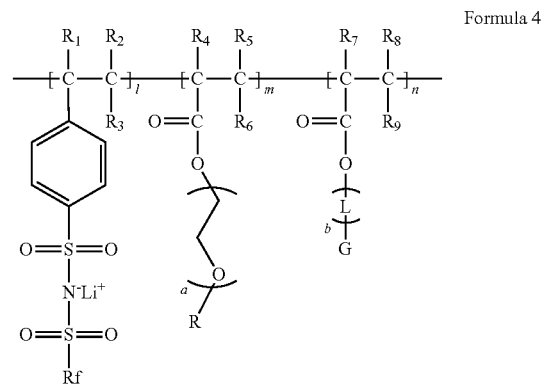

Formula 4 wherein in Formula 4,
l+m+n=1,
0.1≤l≤0.3,
0.4≤m≤0.6, and
0.2≤n≤0.4,
$R_1$ to $R_9$ each independently represent hydrogen, a $C_1$-$C_{20}$ alkyl group, or a $C_6$-$C_{20}$ aryl group,
Rf represents fluorine, a $C_1$-$C_{12}$ perfluorinated alkyl group, or a $C_3$-$C_{12}$ perfluorinated carbocyclic group,
a is an integer between 1 and 20,
R represents a $C_1$-$C_{20}$ alkyl group, a $C_6$-$C_{20}$ aryl group, —$PO_3Li$, or —$SO_2Li$,
L represents an unsubstituted or substituted $C_1$-$C_{20}$ alkylene group, or an unsubstituted or substituted $C_6$-$C_{20}$ arylene group,
b is 0 or an integer between 1 and 5, and
G is a group represented by Formula 3a, or a group represented by Formula 3f,

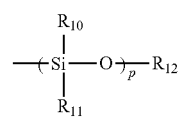

Formula 3a wherein in Formula 3a,
$R_{10}$ to $R_{12}$ each independently represent hydrogen, a $C_1$-$C_{20}$ alkyl group, or a $C_6$-$C_{20}$ aryl group, and

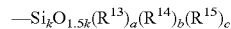

Formula 3f wherein in Formula 3f,
$R^{13}$, $R^{14}$, and $R^{15}$ each independently represent hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_4$-$C_{20}$ carbocyclic group, or a $C_1$-$C_{20}$ silicon-containing functional group, and
k=a+b+c and 6≤k≤20.

* * * * *